United States Patent
Bristol

(10) Patent No.: US 11,029,729 B1
(45) Date of Patent: Jun. 8, 2021

(54) ADJUSTABLE STRAP ASSEMBLIES, SYSTEMS, AND METHODS FOR HEAD-MOUNTED DISPLAYS

(71) Applicant: FACEBOOK TECHNOLOGIES, LLC, Menlo Park, CA (US)

(72) Inventor: Peter Wesley Bristol, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 196 days.

(21) Appl. No.: 15/972,811

(22) Filed: May 7, 2018

(51) Int. Cl.
*G06F 1/16* (2006.01)
*G02B 27/01* (2006.01)

(52) U.S. Cl.
CPC .......... *G06F 1/163* (2013.01); *G02B 27/0176* (2013.01)

(58) Field of Classification Search
CPC ............................ G06F 1/163; G02B 27/0176
USPC .......................................................... 224/181
See application file for complete search history.

(56) References Cited

U.S. PATENT DOCUMENTS

| | | | | |
|---|---|---|---|---|
| 5,276,471 A * | 1/1994 | Yamauchi | .......... | G02B 27/0176 351/153 |
| 5,548,841 A * | 8/1996 | Sherlock | ................ | G02B 7/002 2/15 |
| 5,715,030 A * | 2/1998 | Quaresima | ................ | A61F 9/02 2/12 |
| 5,903,395 A * | 5/1999 | Rallison | ............. | G02B 27/0172 359/630 |
| 6,157,291 A * | 12/2000 | Kuenster | ............ | G02B 27/0172 345/8 |
| 6,313,892 B2 * | 11/2001 | Gleckman | ......... | G02F 1/133615 313/110 |
| 6,351,252 B1 * | 2/2002 | Atsumi | .............. | G02B 27/0176 345/8 |
| D458,287 S * | 6/2002 | Huang | ......................... | D16/135 |
| 6,404,556 B1 * | 6/2002 | Kobayashi | ......... | G02B 17/0848 359/630 |
| 6,480,174 B1 * | 11/2002 | Kaufmann | ......... | G02B 27/0172 345/7 |
| 6,525,887 B1 * | 2/2003 | Tsung-Hui | ............. | G02B 7/002 351/41 |

(Continued)

OTHER PUBLICATIONS

Peter Wesley Bristol et al.; Adjustable Strap Assembly for a Head-Mounted Display; U.S. Appl. No. 15/716,146, filed Sep. 26, 2017.

*Primary Examiner* — Nathan J Newhouse
*Assistant Examiner* — Lester L Vanterpool
(74) *Attorney, Agent, or Firm* — FisherBroyles, LLP

(57) ABSTRACT

A strap assembly may include a lateral strap member configured to extend along a first side and a back of a user's head, the lateral strap member including (1) a proximal portion configured to be coupled to a head-mounted-display device, (2) a distal end disposed away from the proximal portion, and (3) an arcuate biasing section that arcs from the proximal portion to the distal end, the arcuate biasing section including a resilient material. The arcuate biasing section may peripherally surround at least a portion of a reduced region when the arcuate biasing section is in a relaxed state. Additionally, the arcuate biasing section may be tensioned and deflected outward by the user's head when the lateral strap member is worn with the head-mounted-display device by the user. Various other apparatuses, systems, and methods are also disclosed.

15 Claims, 14 Drawing Sheets

(56) References Cited

U.S. PATENT DOCUMENTS

| | | | | |
|---|---|---|---|---|
| D669,471 S * | 10/2012 | Hwang | | D14/372 |
| 8,545,013 B2 * | 10/2013 | Hwang | | G02B 27/0176 |
| | | | | 351/158 |
| 8,743,463 B2 * | 6/2014 | Fujishiro | | G02B 27/0172 |
| | | | | 345/8 |
| 8,894,200 B2 * | 11/2014 | Jirsa | | G02C 5/20 |
| | | | | 351/118 |
| D727,318 S * | 4/2015 | Garcia Marin | | D14/372 |
| 9,038,870 B2 * | 5/2015 | Johnson | | A45C 11/00 |
| | | | | 224/181 |
| 9,143,854 B2 * | 9/2015 | Alao | | H04R 5/0335 |
| 9,519,159 B1 * | 12/2016 | King | | G02C 7/16 |
| 9,810,911 B2 * | 11/2017 | Miller | | G02B 27/0176 |
| 10,209,738 B1 * | 2/2019 | Tompkins | | G06F 1/163 |
| 10,459,236 B2 * | 10/2019 | Lee | | G02B 27/0176 |
| 2010/0327028 A1 * | 12/2010 | Nakabayashi | | G02B 27/0176 |
| | | | | 224/162 |
| 2011/0273662 A1 * | 11/2011 | Hwang | | G02B 27/0176 |
| | | | | 351/158 |
| 2012/0280007 A1 * | 11/2012 | Nakabayashi | | G02B 27/0176 |
| | | | | 224/181 |
| 2013/0306689 A1 * | 11/2013 | Johnson | | A45C 11/00 |
| | | | | 224/181 |
| 2013/0327909 A1 * | 12/2013 | Freelander | | H04M 1/11 |
| | | | | 248/224.7 |
| 2015/0234189 A1 * | 8/2015 | Lyons | | G02B 27/0093 |
| | | | | 345/174 |
| 2015/0290039 A1 * | 10/2015 | McCulloch | | A42B 3/24 |
| | | | | 2/439 |
| 2015/0338677 A1 * | 11/2015 | Block | | G02C 3/02 |
| | | | | 351/63 |
| 2018/0124366 A1 * | 5/2018 | Kusuda | | G02B 27/0176 |
| 2018/0136476 A1 * | 5/2018 | Kusuda | | G02B 27/02 |
| 2018/0164594 A1 * | 6/2018 | Lee | | G02B 27/0176 |
| 2018/0196268 A1 * | 7/2018 | Westra | | G02B 7/004 |
| 2018/0284454 A1 * | 10/2018 | Reed | | G02B 27/0176 |
| 2018/0290039 A1 * | 10/2018 | Wagner | | A63B 69/345 |
| 2018/0292660 A1 * | 10/2018 | Eastwood | | G02C 5/16 |
| 2018/0307282 A1 * | 10/2018 | Allin | | G06F 1/203 |
| 2018/0321707 A1 * | 11/2018 | Hu | | G02B 27/0176 |
| 2018/0322708 A1 * | 11/2018 | Luccin | | G02B 27/0172 |
| 2018/0323508 A1 * | 11/2018 | Chigusa | | H01Q 3/247 |
| 2018/0341286 A1 * | 11/2018 | Markovsky | | A42B 3/12 |
| 2018/0364491 A1 * | 12/2018 | Park | | G06F 3/011 |
| 2018/0376626 A1 * | 12/2018 | Hurbi | | H05K 7/20963 |
| 2019/0037715 A1 * | 1/2019 | Chen | | H05K 5/0017 |
| 2019/0138053 A1 * | 5/2019 | Hwang | | G06F 1/1637 |
| 2019/0204606 A1 * | 7/2019 | Yang | | G06T 19/006 |

* cited by examiner

ADJUSTABLE STRAP ASSEMBLIES, SYSTEMS, AND METHODS FOR HEAD-MOUNTED DISPLAYS

BACKGROUND

Virtual reality and augmented reality headsets are widely gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

In any use of a virtual or augmented reality system, making the experience as immersive as possible may be critical. Regrettably, a variety of factors may disrupt virtual-reality immersion, and one of the most significant disruptions to having an immersive experience may be an ill-fitting headset. Traditional virtual and augment reality systems may provide some options for addressing a poor fit, but these options may be sub-optimal. For example, adjusting a traditional headset for comfortable facial pressure and proper size may involve making complicated manual changes over several fitting attempts. This process may be time-consuming, and for some users, finding a good fit may be quite difficult. The instant disclosure, therefore, identifies a need for improved systems and methods that simply the fitting of virtual reality headsets.

SUMMARY

As will be described in greater detail below, the instant disclosure generally relates to adjustable strap assemblies, head-mounted-display systems, and related methods. In one example, a strap assembly may include a lateral strap member configured to extend along a first side and a back of a user's head, the lateral strap member including (1) a proximal portion configured to be coupled to a head-mounted-display device, (2) a distal end disposed away from the proximal portion, and (3) an arcuate biasing section that arcs from the proximal portion to the distal end, the arcuate biasing section including a resilient material. The arcuate biasing section may peripherally surround at least a portion of a reduced region when the arcuate biasing section is in a relaxed state. Additionally, the arcuate biasing section may be tensioned and deflected outward by the user's head when the lateral strap member is worn with the head-mounted-display device by the user such that the arcuate biasing section peripherally surrounds at least a portion of an increased region that is greater in size than the reduced region and such that at least a portion of the arcuate biasing section is biased toward the user's head.

In some embodiments, the arcuate biasing section may include an arcuate band of the resilient material. The resilient material may include at least one of a metal material, polymer material, or a composite material. According to at least one example, the distal end of the lateral strap member may be movable with respect to the proximal portion of the lateral strap member. At least the portion of the arcuate biasing section may be biased toward at least one of the first side or the back of the user's head when the lateral strap member is worn with the head-mounted-display device by the user. The arcuate biasing section may be substantially unstretched when the lateral strap member is worn with the head-mounted-display device by the user.

In at least one embodiment, when the lateral strap member is worn with the head-mounted-display device by the user, a radius of curvature of at least a region of the arcuate biasing section may be greater than a radius of curvature of at least the region of the arcuate biasing section when the arcuate biasing section is in the relaxed state. The arcuate biasing section may be configured to extend along a second side of the user's head.

According to some embodiments, the lateral strap member may be a first lateral strap member and the strap assembly may further include a second lateral strap member configured to extend along a second side of the user's head. In this example, the second lateral strap member may include (1) a proximal portion configured to be coupled to the head-mounted-display device, (2) a distal end disposed away from the proximal portion of the second lateral strap member, and (3) an arcuate biasing section that arcs from the proximal portion to the distal end of the second lateral strap member, the arcuate biasing section of the second lateral strap member including a resilient material.

Part of the arcuate biasing section of the second lateral strap member may overlap part of the arcuate biasing section of the first lateral strap member. In at least one example, the distal end of the arcuate biasing section of the first lateral strap member may be movable with respect to the distal end of the arcuate biasing section of the second lateral strap member such that an area of overlap between the arcuate biasing section of the first lateral strap member and the arcuate biasing section of the second lateral strap member is greater when the arcuate biasing section of the first lateral strap member and the arcuate biasing section of the second lateral strap member are each in a relaxed state than when the first lateral strap member and the second lateral strap member are worn with the head-mounted-display device by the user. Additionally or alternatively, the arcuate biasing section of the second lateral strap member may overlap part of the arcuate biasing section of the first lateral strap member at the back of the user's head when the first lateral strap member and the second lateral strap member are worn with the head-mounted-display device by the user.

According to some embodiments, the strap assembly may include a top strap coupled with each of the first lateral strap member and the second lateral strap member, the top strap including a proximal portion configured to be adjustably coupled to the head-mounted-display device. In this example, the top strap may include a split region having a first distal end section coupled to the arcuate biasing section of the first lateral strap member and a second distal end section coupled to the arcuate biasing section of the second lateral strap member. A main body section of the top strap may be coupled to each of the first distal end section and the second distal end section at a junction region of the top strap. In at least one example, the first distal end section may be movable, relative to the main body section, in conjunction with the arcuate biasing section of the first lateral strap member. Additionally, the second distal end section may be movable, relative to the main body section, in conjunction with the arcuate biasing section of the second lateral strap member.

A corresponding head-mounted-display system may include a head-mounted-display device and a lateral strap member configured to extend along a first side and a back of a user's head, the lateral strap member including a proximal portion coupled to the head-mounted-display device. A corresponding method may include coupling a head-mounted-display device to a lateral strap member configured to extend along a first side and a back of a user's head.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
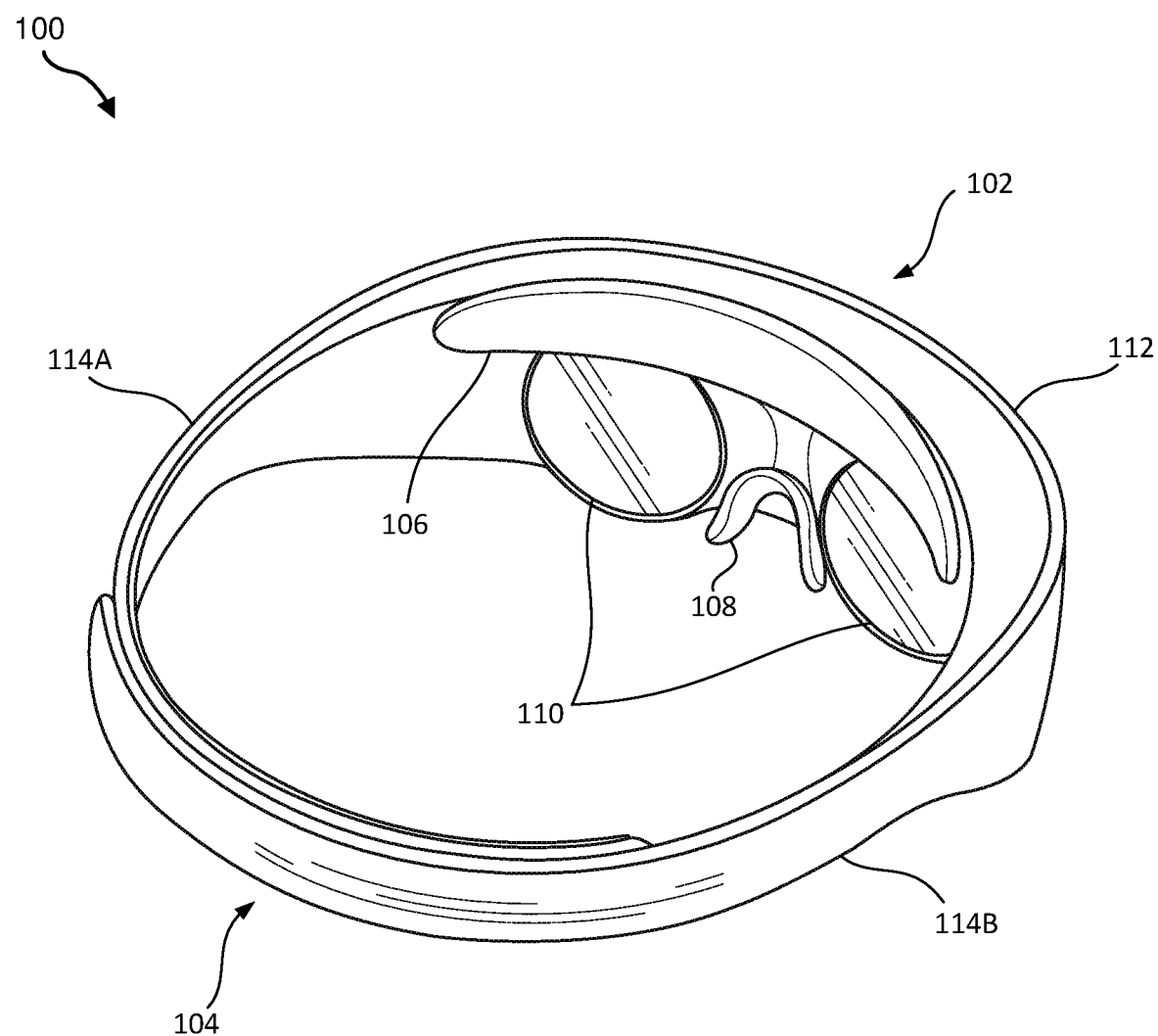
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to various adjustable strap assemblies for head-mounted displays, head-mounted-display systems, and related methods. As will be explained in greater detail below, embodiments of the instant disclosure may include strap assemblies that are constructed of two cooperating lateral strap members that provide automatic scaling adjustment to a variety of head sizes and shapes. The lateral strap members may be made of any suitable material that has a memory such that the lateral strap members apply a large scale constant force to a user's head. The lateral strap members may be forced outward to accommodate a range of head sizes and shapes while maintaining the constant inward force allowing the headset to snugly conform to the user's head and face. In some examples, the strap assemblies may also include a top-strap having a split configuration (e.g., a swallow-tail-shaped configuration) for attaching to both of the lateral strap members at the back of the user's head.

According some embodiments, strap assemblies may have one or more lateral strap members that are configured to extend along side and back regions of a user's head. The lateral strap members may each be coupled to a head-mounted-display device and may include an arcuate biasing section that arcs from a proximal portion coupled to the head-mounted-display device and a distal end that is movable relative to the head-mounted-display device. The arcuate biasing sections, which may include a resilient material (e.g., an arcuate band formed of resilient metal, polymer, and/or composite material) may be tensioned and deflected outward by the user's head when a head-mounted-display system including the strap assembly is mounted to the user's such that each of the arcuate biasing section is biased toward the user's head. The arcuate biasing sections of the one or more lateral strap members may enable the strap assembly to automatically adjust to the user's head shape and size with little or no manual adjustment of the strap assembly required by the user. Substantially constant large-scale forces applied by the tensioned arcuate biasing sections of the one or more lateral strap members against the user's head may securely hold the head-mounted-display device on the user's head. The strap assemblies may be adjusted to a variety of user head sizes and shapes, enabling the head-mounted-display systems to be easily and comfortably worn by various users.

In some embodiments, strap assemblies may include an adjustable top strap coupled with each of a first lateral strap member and a second lateral strap member. The top strap may include first and second distal end sections that are respectively movable in conjunction with arcuate biasing sections of the first and second lateral strap members. The top strap may enable headsets to be more securely mounted to a user's head while allowing for automatic adjustment of the lateral strap members. Accordingly, the strap assemblies may allow users having various head shapes and sizes to easily adjust and comfortably wear head-mounted displays with minimal effort.

The following will provide, with reference to FIGS. 1-7B, examples of head-mounted-display systems including adjustable strap assemblies. In addition, the discussion corresponding to FIG. 8 will provide examples of methods for assembling adjustable facial-interface systems.

Figure 2A:
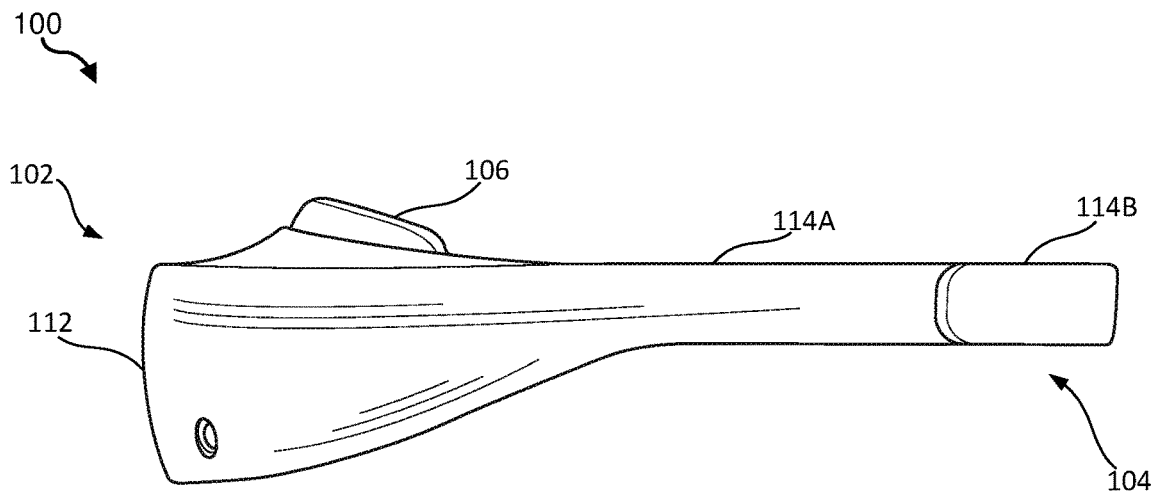
FIG. 2A is a side view of the exemplary head-mounted-display system of FIG. 1 in accordance with some embodiments.
Figure 2B:
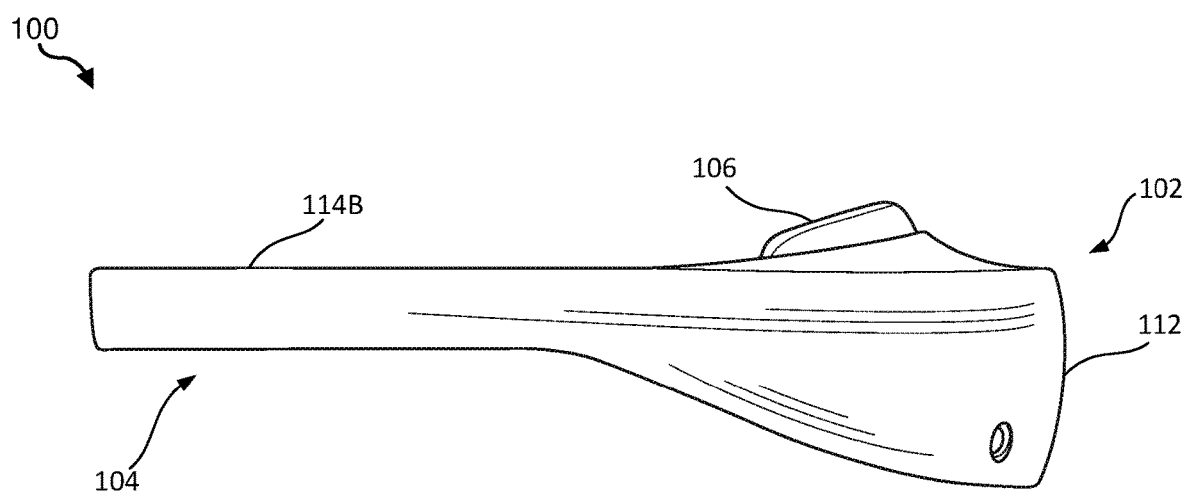
FIG. 2B is a side view of the exemplary head-mounted-display system of FIG. 1 in accordance with some embodiments.
Figure 2C:
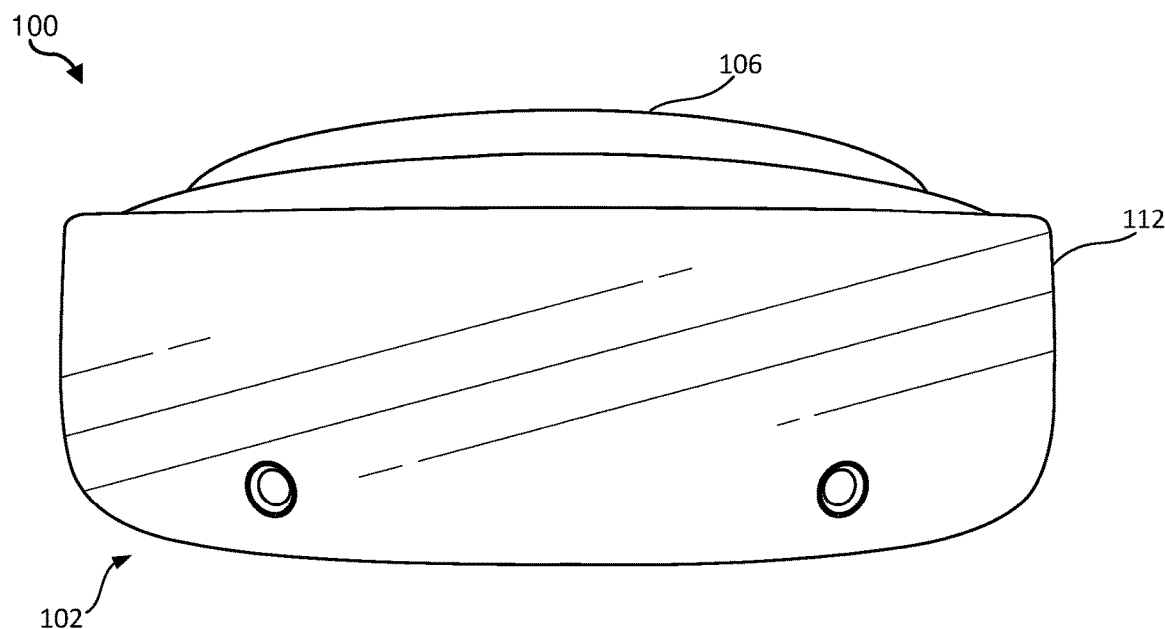
FIG. 2C is a front view of the exemplary head-mounted-display system of FIG. 1 in accordance with some embodiments.
Figure 2D:
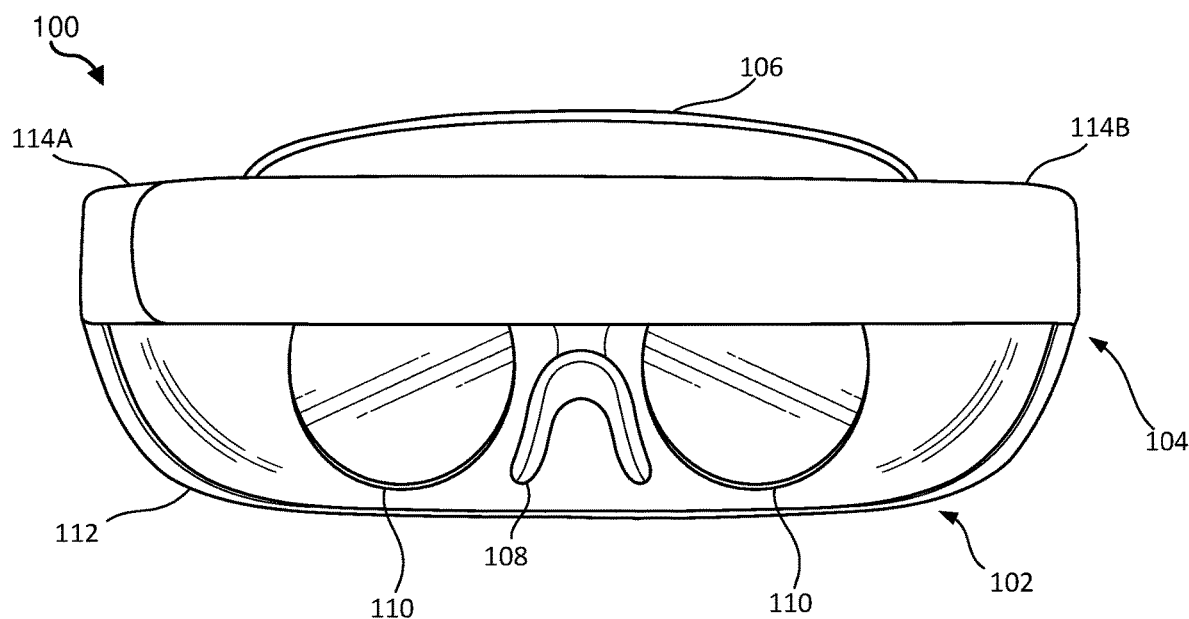
FIG. 2D is a rear view of the exemplary head-mounted-display system of FIG. 1 in accordance with some embodiments.
Figure 2E:
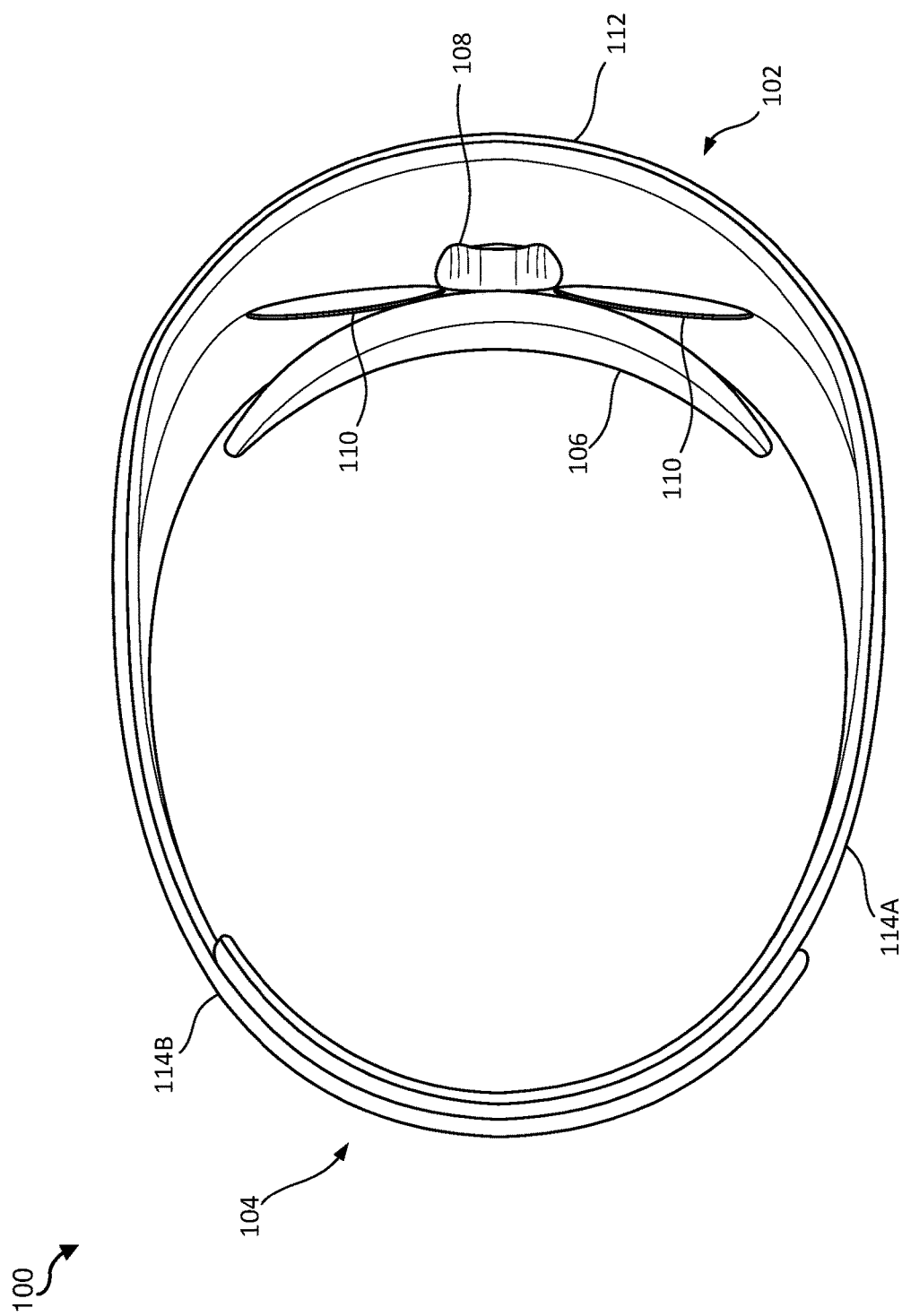
FIG. 2E is a bottom view of the exemplary head-mounted-display system of FIG. 1 in accordance with some embodiments.

FIGS. 1-2E are views of a head-mounted-display system 100 in accordance with some embodiments. In some embodiments, head-mounted-display system 100 may include a head-mounted-display device 102 (i.e., a head-mounted display) and a strap assembly 104. The head-mounted-display devices described herein may be any type or form of display device or system that is worn on or about a user's head and displays visual content to the user. Head-mounted-display devices may display content in any suitable manner, including via a screen (e.g., an LCD or LED screen), a projector, a cathode ray tube, an optical mixer, etc. Head-mounted-display devices may display content in one or more of various media formats. For example, a head-mounted display may display video, photos, and/or computer-generated imagery (CGI). Head-mounted-display device 102 may include a display housing 112 surrounding various components of head-mounted-display device 102, including display-viewing lenses 110 and various electronic components, including display components as described above.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, audio subsystems (e.g., audio subsytems 238 shown in FIG. 5A) may be integrated with head-mounted-display device 102 and may provide audio signals to the user's ears. Head-mounted-display system 100 may, for example, have two audio subsystems located on the left and right sides of head-mounted-display system 100 to provide audio signals to the user's left and right ears.

In some embodiments, head-mounted-display device 102 may be configured to comfortably rest against a region of the user's face. For example, as shown in FIGS. 1-2E, head-mounted-display device 102 may include a facial interface 106 having a cushion material configured comfortably to rest against portions of the user's face (e.g., at least a portion of the user's forehead). In at least one example, head-mounted-display device 102 may also include a nose piece 108 configured to comfortably rest against the user's nose, as shown in FIGS. 1, 2D, and 2E.

Strap assembly 104 may be used for adjustably mounting head-mounted-display device 102 on the user's head. Strap assembly 104 may include at least one lateral strap member that is automatically adjustable to fit around a user's head. For example, strap assembly 104 may include two cooperating lateral strap members (i.e., a first lateral strap member 114A and a second lateral strap member 114B) that provide automatic scaling adjustment to a variety of head sizes and shapes. As shown in FIGS. 1-2E, first lateral strap member 114A and second lateral strap member 114B may be coupled to head-mounted-display device 102 to adjustably conform to the sides (i.e., left and right sides) and back of the user's head when the user is wearing head-mounted-display device 102.

According to some embodiments, first lateral strap member 114A and second lateral strap member 114B may each include a resilient material, such as a resilient band, that extends from head-mounted-display device 102 to a distal end portion. At least a portion of first lateral strap member 114A and second lateral strap member 114B may overlap. For example, portions of first lateral strap member 114A and second lateral strap member 114B may overlap each other at a region configured to abut the back of a user's head. First lateral strap member 114A and second lateral strap member 114B may be dimensioned such that they circumferentially define, in conjunction with head-mounted-display device 102, an inner region that is smaller than a circumferential portion of a user's head around which first lateral strap member 114A and second lateral strap member 114B are configured to extend when mounted to the user's head. As will be described in greater detail below, at least a portion of each of first lateral strap member 114A and second lateral strap member 114B may be deflected outward as a user positions head-mounted-display system 100 on their head, and first lateral strap member 114A and second lateral strap member 114B may apply opposing force toward the user's head in response to the deflection, thereby securing head-mounted-display system 100 to the user's head.

Figure 3A:
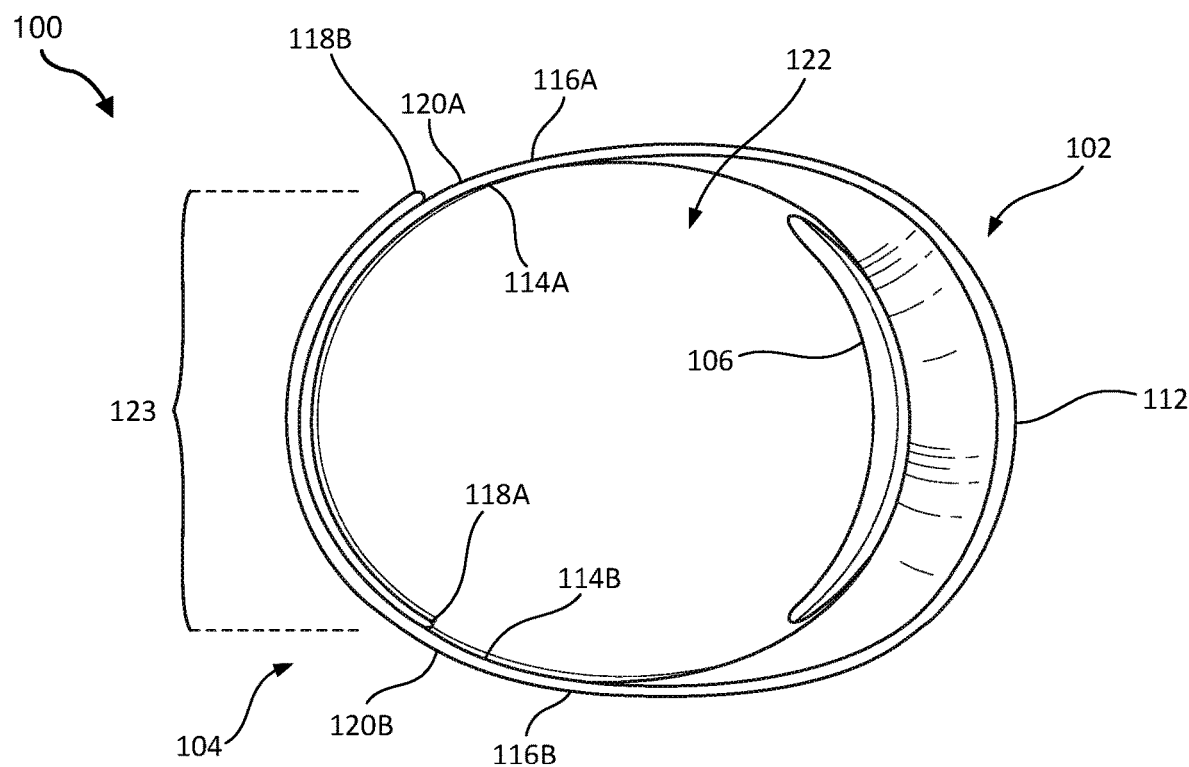
FIG. 3A is a top view of the exemplary head-mounted-display system of FIG. 1 in accordance with some embodiments.
Figure 3B:
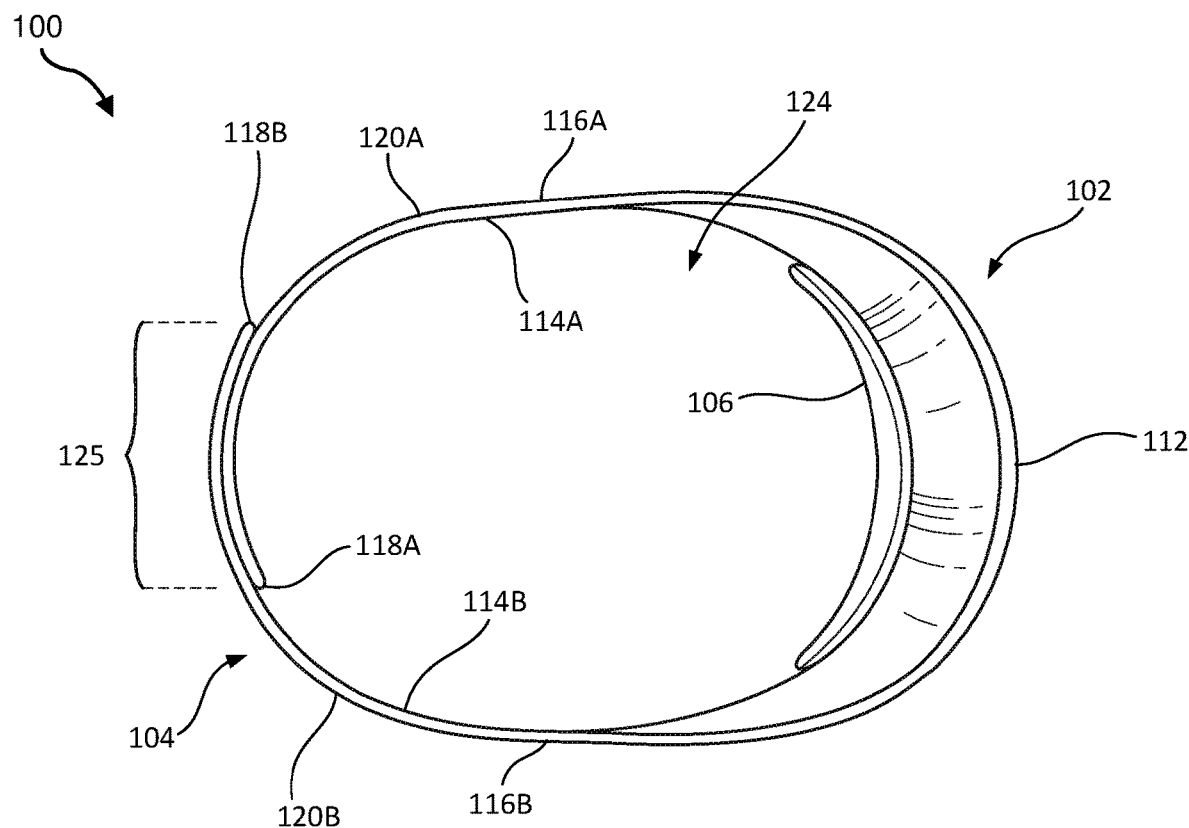
FIG. 3B is a top view of the exemplary head-mounted-display system of FIG. 1 in accordance with some embodiments.
Figure 4A:
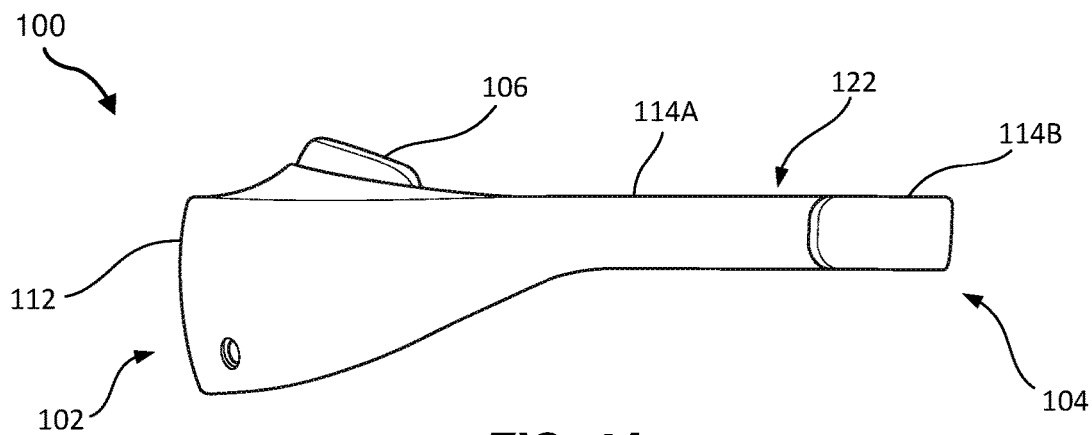
FIG. 4A is a side view of the exemplary head-mounted-display system of FIG. 1 in accordance with some embodiments.
Figure 4B:
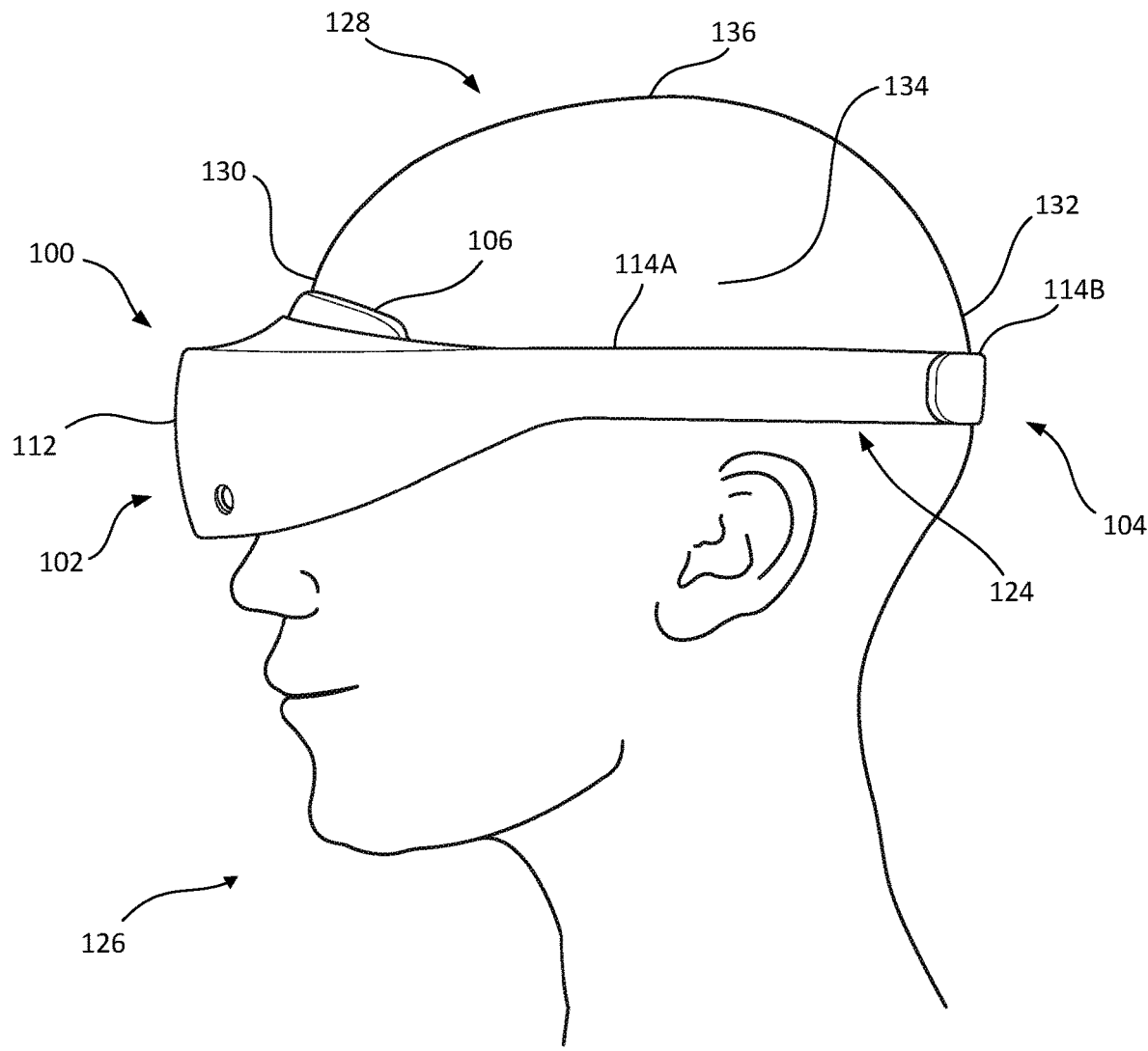
FIG. 4B is a side view of the exemplary head-mounted-display system of FIG. 1 worn by a user in accordance with some embodiments.

FIGS. 3A and 3B are top views of head-mounted-display system 100 (see, e.g., FIGS. 1-2E) with first lateral strap member 114A and second lateral strap member 114B in a relaxed state and in a tensioned state, respectively. Additionally, FIG. 4A shows a side view of head-mounted-display system 100 with first lateral strap member 114A and second lateral strap member 114B in a relaxed state and FIG. 4B shows a side view of head-mounted-display system 100 with first lateral strap member 114A and second lateral strap member 114B in a tensioned state and mounted to a user's head. As illustrated in these figures, first lateral strap member 114A and second lateral strap member 114B may respectively include a proximal portion 116A and a proximal portion 116B that are each configured to be coupled to head-mounted-display device 102. For example, first lateral strap member 114A may be configured to extend along a left side of a user's face and may be coupled to a left side of head-mounted-display device 102. Additionally, second lateral strap member 114B may be configured to extend along a right side of a user's face and may be coupled to a right side of head-mounted-display device 102. In some embodiments, first lateral strap member 114A and second lateral strap member 114B may be integrally formed with head-mounted-display device 102 at proximal portion 116A and proximal portion 116B. Additionally or alternatively, first lateral strap member 114A and/or second lateral strap member 114B may be a separate member coupled to head-mounted-display device 102 in any suitable manner.

According to at least one embodiment, first lateral strap member 114A and second lateral strap member 114B may each extend from head-mounted-display device 102 to a distal end 118A and a distal end 118B, respectively. In some examples, distal end 118A and distal end 118B may be disposed away from proximal portion 116A and proximal portion 116B, respectively. Distal end 118A and distal end 118B may not be directly attached to head-mounted-display device 102 (i.e., distal end 118A and distal end 118B may be free ends) such that distal end 118A and distal end 118B are movable relative to each other and relative to head-mounted-display device 102. For example, portions of first lateral strap member 114A and second lateral strap member 114B that respectively include distal end 118A and distal end 118B may slidably overlap and/or abut one another, allowing for deflection and tensioning of first lateral strap member 114A and second lateral strap member 114B while maintaining contact between overlapping portions of first lateral strap member 114A and second lateral strap member 114B.

According to some embodiments, first lateral strap member 114A and second lateral strap member 114B may each respectively include an arcuate biasing section 120A and an arcuate biasing section 120B. For example, arcuate biasing section 120A of first lateral strap member 114A may arc from proximal portion 116A to distal end 118A. Additionally, arcuate biasing section 120B of second lateral strap member 114B may arc from proximal portion 116B to distal end 118B. Arcuate biasing section 120A and arcuate biasing section 120B may each follow any suitable arcuate path, with arcuate biasing section 120A and arcuate biasing section 120B generally arcing toward each other so as to partially overlap one another. In some examples, arcuate biasing section 120A and arcuate biasing section 120B may each arc continuously from proximal portion 116A and proximal portion 116B to distal end 118A and distal end 118B, respectively. In at least one example, at least a portion of arcuate biasing section 120A and/or arcuate biasing section 120B may follow a generally or substantially semi-circular or semi-ellipsoidal path. According to some examples, arcuate biasing section 120A and/or arcuate biasing section 120B may have a substantially constant radius of curvature along the respective length. Additionally or alternatively, a radius of curvature of arcuate biasing section 120A and/or arcuate biasing section 120B may vary along the length.

First lateral strap member 114A and second lateral strap member 114B may each be formed of any suitable material (e.g., a resilient material) that has a memory such that first lateral strap member 114A and second lateral strap member 114B apply a large scale constant force to a user's head. For example, arcuate biasing section 120A and arcuate biasing section 120B may each include an arcuate band of resilient material. In some examples, such a band of resilient material may be disposed in other portions of first lateral strap member 114A, second lateral strap member 114B, and/or in head-mounted-display device 102. For example, a band of resilient material may extend from first lateral strap member 114A through and/or over at least a portion of head-mounted-display device 102 to second lateral strap member 114B. The band of resilient material may include any suitable material, such as a memory material or other flexible material, that returns to its original condition after deformation. For example, arcuate biasing section 120A and arcuate biasing section 120B of first lateral strap member 114A and second lateral strap member 114B may each include a resilient metal material (e.g., spring steel, etc.), polymer material (e.g., a nylon material, etc.), or a composite material. A band of resilient material may include a material that provides a desired combination of resilience and rigidity allowing for deformation of at least a portion of each of arcuate biasing section 120A and arcuate biasing section 120B while providing sufficient structural support (via, for example a restoring force when tensioned) to secure head-mounted-display system 100 to a user's head.

A band of resilient material in first lateral strap member 114A and/or second lateral strap member 114B may also have any suitable size and shape providing a desired combination of resilience and rigidity. In some examples, the band of resilient material may have a substantially constant thickness along the length of arcuate biasing section 120A and/or arcuate biasing section 120B. Additionally or alternatively, the band of resilient material may vary in thickness. In some embodiments, first lateral strap member 114A and/or second lateral strap member 114B may include one or more additional materials. For example, first lateral strap member 114A and/or second lateral strap member 114B may include a cushioning layer on a side facing the user's head and/or may include a protective layer along the exterior of the band of resilient material.

As shown in FIGS. 3A and 4A, when head-mounted-display system 100 is not mounted to a user's head, arcuate biasing section 120A and arcuate biasing section 120B may peripherally surround at least a portion of a reduced region 122 and arcuate biasing section 120A and arcuate biasing section 120B may be in a relaxed (i.e., substantially untensioned) state. Reduced region 122 may, for example, be peripherally surrounded by first lateral strap member 114A, second lateral strap member 114B, and head-mounted-display device 102. When arcuate biasing section 120A and arcuate biasing section 120B are in the relaxed state, arcuate biasing section 120A may have an area of overlap 123 with arcuate biasing section 120B.

Subsequently, as shown in FIGS. 3B and 4B, when head-mounted-display system 100 is mounted to a user's head, arcuate biasing section 120A and arcuate biasing section 120B may peripherally surround at least a portion of an increased region 124. The size of increased region 124 may correspond to the size of a portion of a user's head surrounded by head-mounted-display system 100, as shown in FIG. 4B, and may be larger than the size of reduced region 122 shown in FIGS. 3A and 4A. FIG. 4B illustrates head 128 of exemplary user 126, with a face 130, a back 132, a side 134 (e.g., a left side), and a top 136 of head 128 shown. As illustrated in this figure, head-mounted-display system 100 may surround and abut the face 130, back 132 and sides (including visible side 134 and the opposite side not shown in FIG. 4B) of head 128 of user 126. For example, head-mounted-display device 102 may abut face 130, first lateral strap member 114A, including arcuate biasing section 120A, may extend along and abut side 134 and back 132, and second lateral strap member 114B, including arcuate biasing section 120B, may extend along and abut back 132 and the opposite side (e.g., the right side) of head 128 of user 126.

Arcuate biasing section 120A and arcuate biasing section 120B may be tensioned and deflected outward by the user's head from the configuration shown in FIGS. 3A and 4A to the configuration shown in FIGS. 3B and 4B. Additionally, one or more regions of arcuate biasing section 120A and arcuate biasing section 120B may have a larger radius of curvature in the tensioned state (see FIG. 3B) than in the relaxed state (see FIG. 3A). In some examples, in addition to surrounding a larger area (i.e., increased region 124) when arcuate biasing section 120A and arcuate biasing section 120B are in the tensioned state, head-mounted-display system 100 may surround an area having a different shape in the tensioned state than in the relaxed state due to the outward deflection of arcuate biasing section 120A and arcuate biasing section 120B. In some examples, arcuate biasing section 120A and/or arcuate biasing section 120B may experience different amounts of deflection in different regions. According to at least one example, at least a portion of arcuate biasing section 120A and/or arcuate biasing section 120B may be substantially straightened when deflected by a user's head. For example, a region of arcuate biasing section 120A and/or arcuate biasing section 120B at or near proximal portion 116A and/or 1162, respectively, may be substantially straightened when mounted to a user's head.

In at least one example, arcuate biasing section 120A and arcuate biasing section 120B may include a resilient material having little or no elastic stretchability such that arcuate biasing section 120A and arcuate biasing section 120B are substantially non-stretched when tensioned and deflected by the user's head. Head-mounted-display system 100 may be mounted to various user head sizes and shapes and amounts of tension and deflection in various portions of arcuate biasing section 120A and arcuate biasing section 120B may vary based on the size and/or shape of a particular user's head. Arcuate biasing section 120A and arcuate biasing section 120B may not be directly coupled to each other such that arcuate biasing section 120A and arcuate biasing section 120B are slidably movable with respect to each other, allowing for deflection of arcuate biasing section 120A and arcuate biasing section 120B from the relaxed state of FIGS. 3A and 4A to the tensioned state of FIGS. 3B and 4B.

First lateral strap member 114A and second lateral strap member 114B may each be forced outward to accommodate a range of head sizes and shapes while maintaining a constant inward force allowing head-mounted-display device 102 to snugly conform to the user's head and face. For example, when arcuate biasing section 120A and arcuate biasing section 120B are tensioned and deflected outward, as shown in FIGS. 3B and 4B, to accommodate left, right, and/or back portions of a user's head, at least a portion of arcuate biasing section 120A and arcuate biasing section 120B may be biased toward the user's head by, for example, a restoring force of a resilient material of arcuate biasing section 120A and arcuate biasing section 120B. For example, arcuate biasing section 120A and arcuate biasing section 120B may be biased toward left, right, and/or back portions of the user's head. When arcuate biasing section 120A and arcuate biasing section 120B are in the tensioned state, arcuate biasing section 120A may have an area of overlap 125 (see FIG. 3B) with arcuate biasing section 120B that is less then area of overlap 123 between arcuate biasing section 120A and arcuate biasing section 120B when in the relaxed state (see FIG. 3A). As shown in FIGS. 3B and 4B, arcuate biasing section 120B may overlap and be biased against a portion of arcuate biasing section 120A in area of overlap 125 such that arcuate biasing section 120A and arcuate biasing section 120B collectively exert a force against a back of the user's head adjacent to area of overlap 125.

Figure 5A:
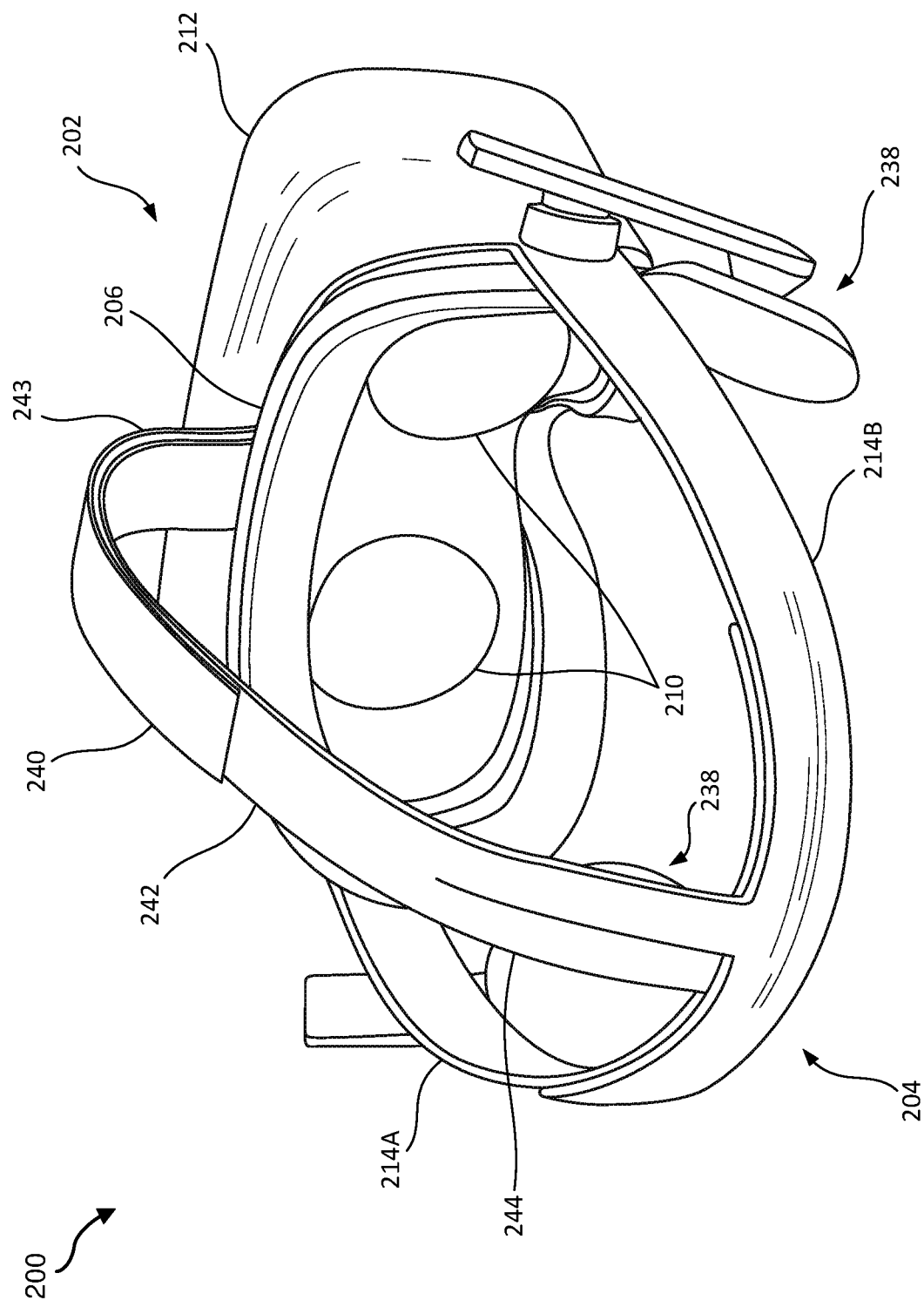
FIG. 5A is a perspective view of an exemplary head-mounted-display system in accordance with some embodiments.
Figure 5B:
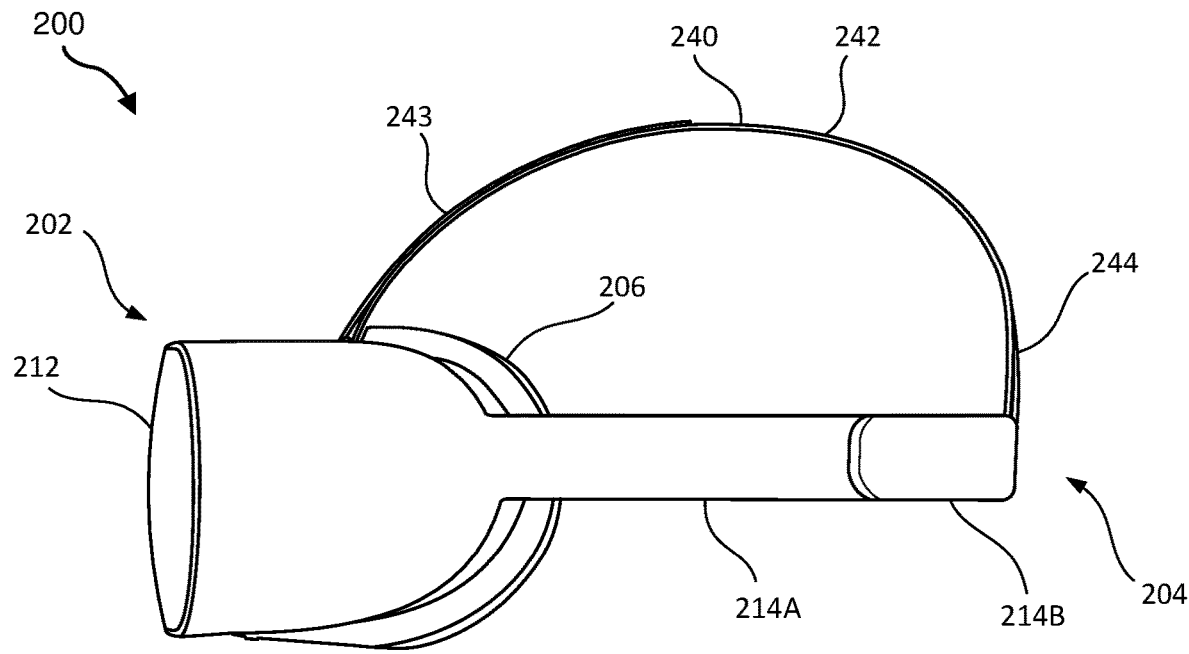
FIG. 5B is a side view of the exemplary head-mounted-display system of FIG. 5A in accordance with some embodiments.
Figure 5C:
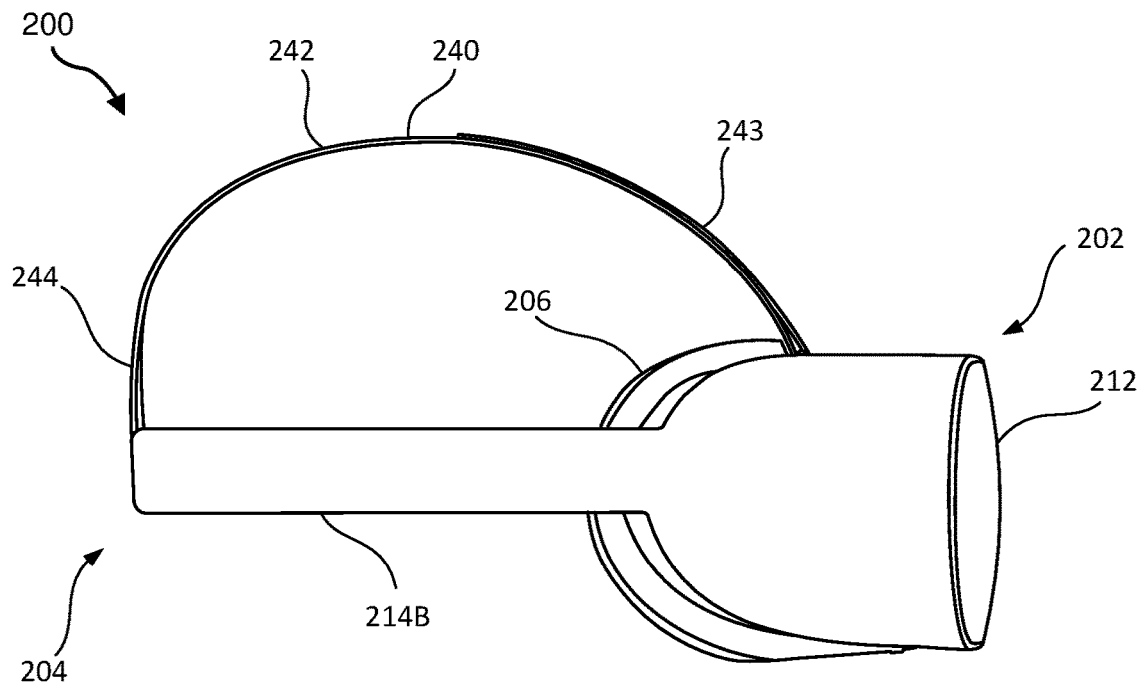
FIG. 5C is a side view of the exemplary head-mounted-display system of FIG. 5A in accordance with some embodiments.
Figure 5D:
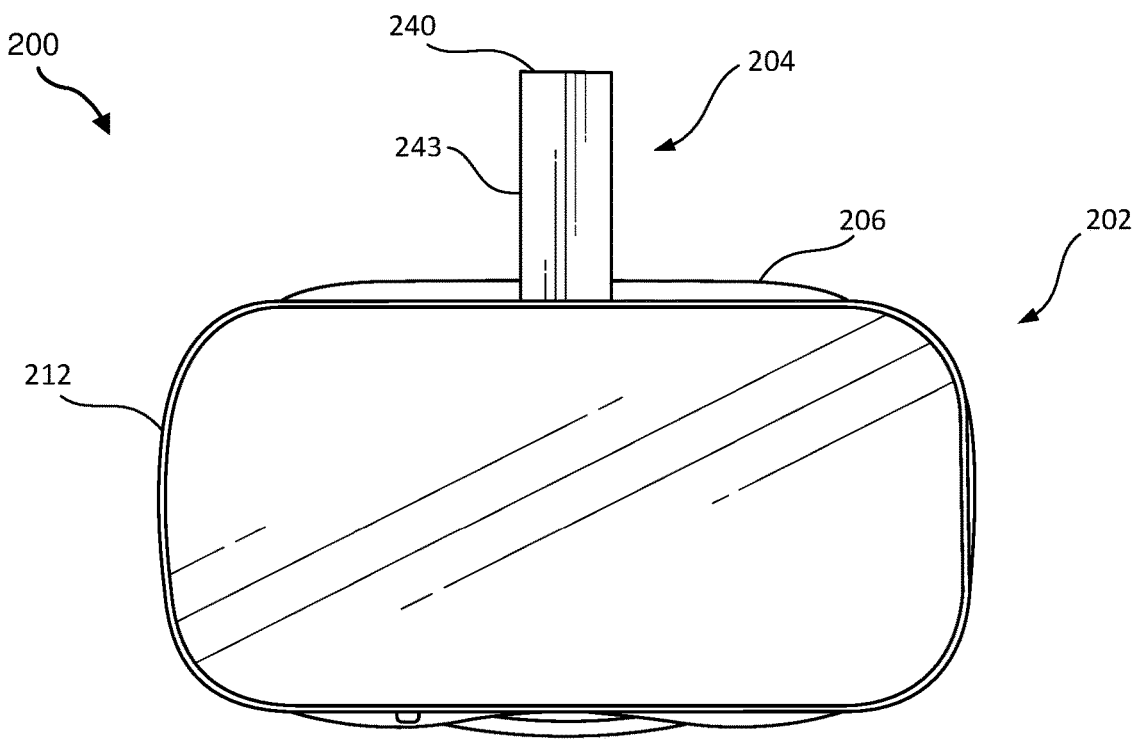
FIG. 5D is a front view of the exemplary head-mounted-display system of FIG. 5A in accordance with some embodiments.
Figure 5E:
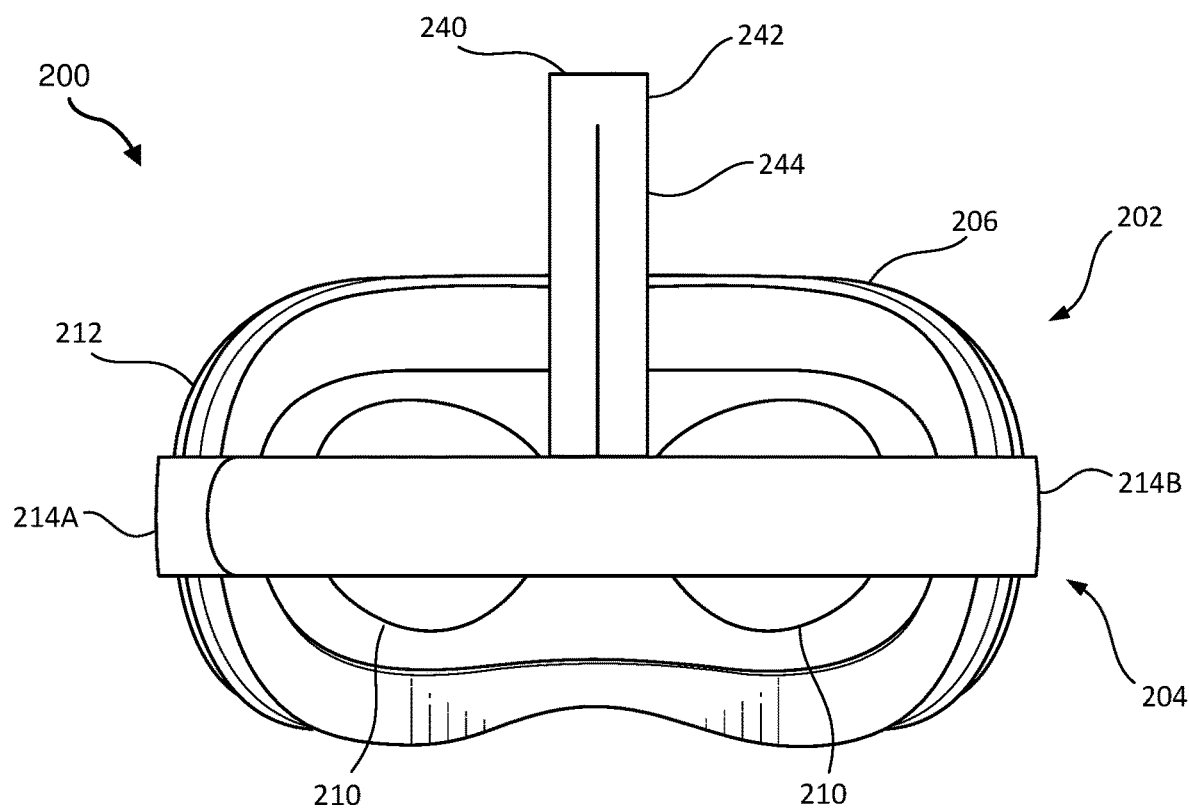
FIG. 5E is a rear view of the exemplary head-mounted-display system of FIG. 5A in accordance with some embodiments.

FIGS. 5A-5G are views of a head-mounted-display system 200 having a top strap 240 in accordance with some embodiments. In at least one embodiment, head-mounted-display system 200 may include a head-mounted-display device 202, a strap assembly 204, and a facial interface 206 surrounding a viewing region. Head-mounted-display device 202 may include a display housing 212 surrounding various components of head-mounted-display device 202, including display-viewing lenses 210 and various electronic components, including display components as described above. Head-mounted-display system 200 may also include audio subsystems 238 to provide audio signals to the user's left and right ears, as illustrated in FIG. 5A.

Strap assembly 204 may include at least one lateral strap member that is automatically adjustable to fit around a user's head. For example, as shown in FIGS. 5A-5C and 5E-5G, strap assembly 204 may include a first lateral strap member 214A and a second lateral strap member 214B that are coupled to head-mounted-display device 202 to adjustably conform to the sides (i.e., left and right sides) and back of the user's head when the user is wearing head-mounted-display device 202 (see, e.g., FIG. 4B), as described above in relation to FIGS. 1-4B (see, e.g., first lateral strap member 114A and a second lateral strap member 114B).

Figure 5F:
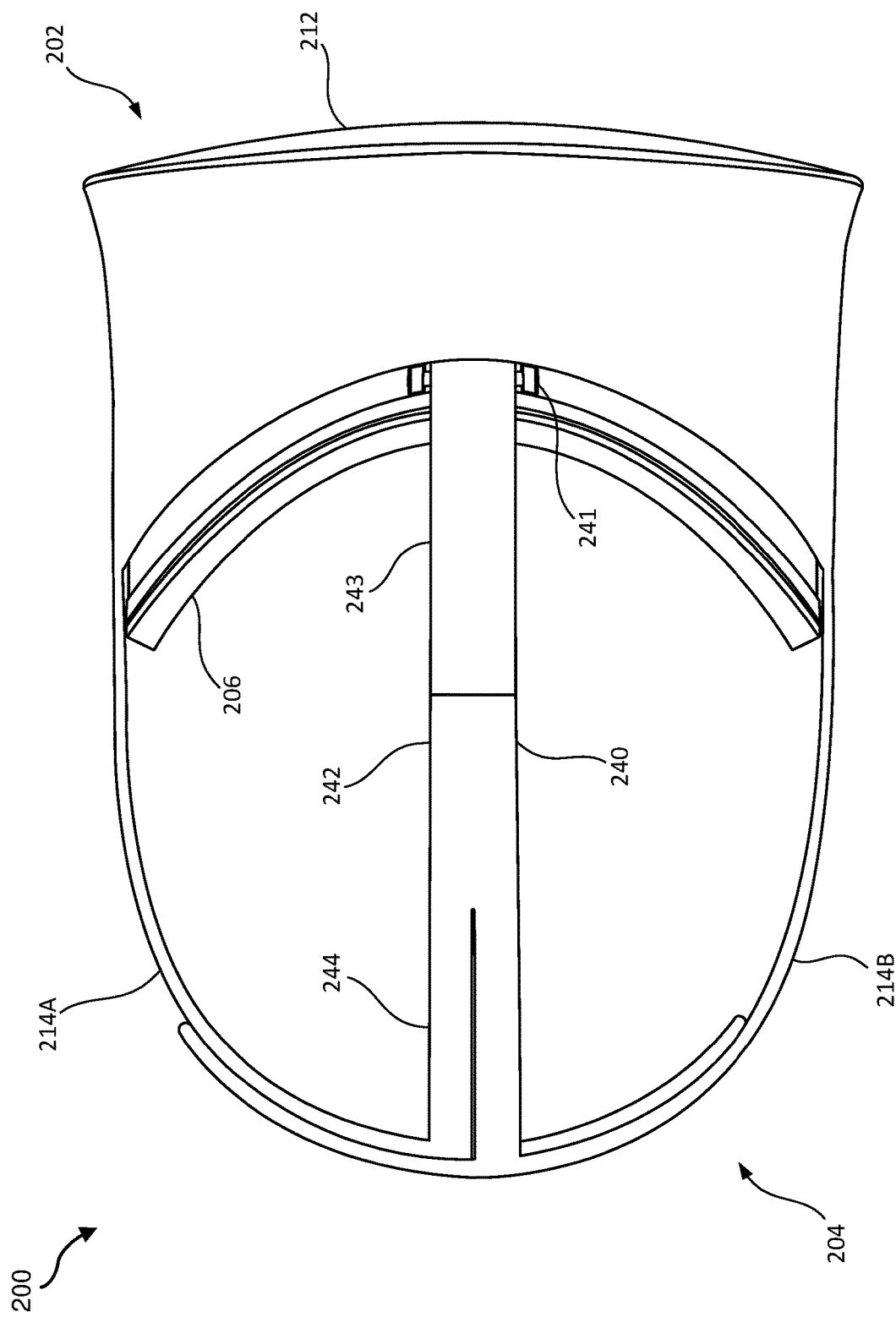
FIG. 5F is a top view of the exemplary head-mounted-display system of FIG. 5A in accordance with some embodiments.
Figure 5G:
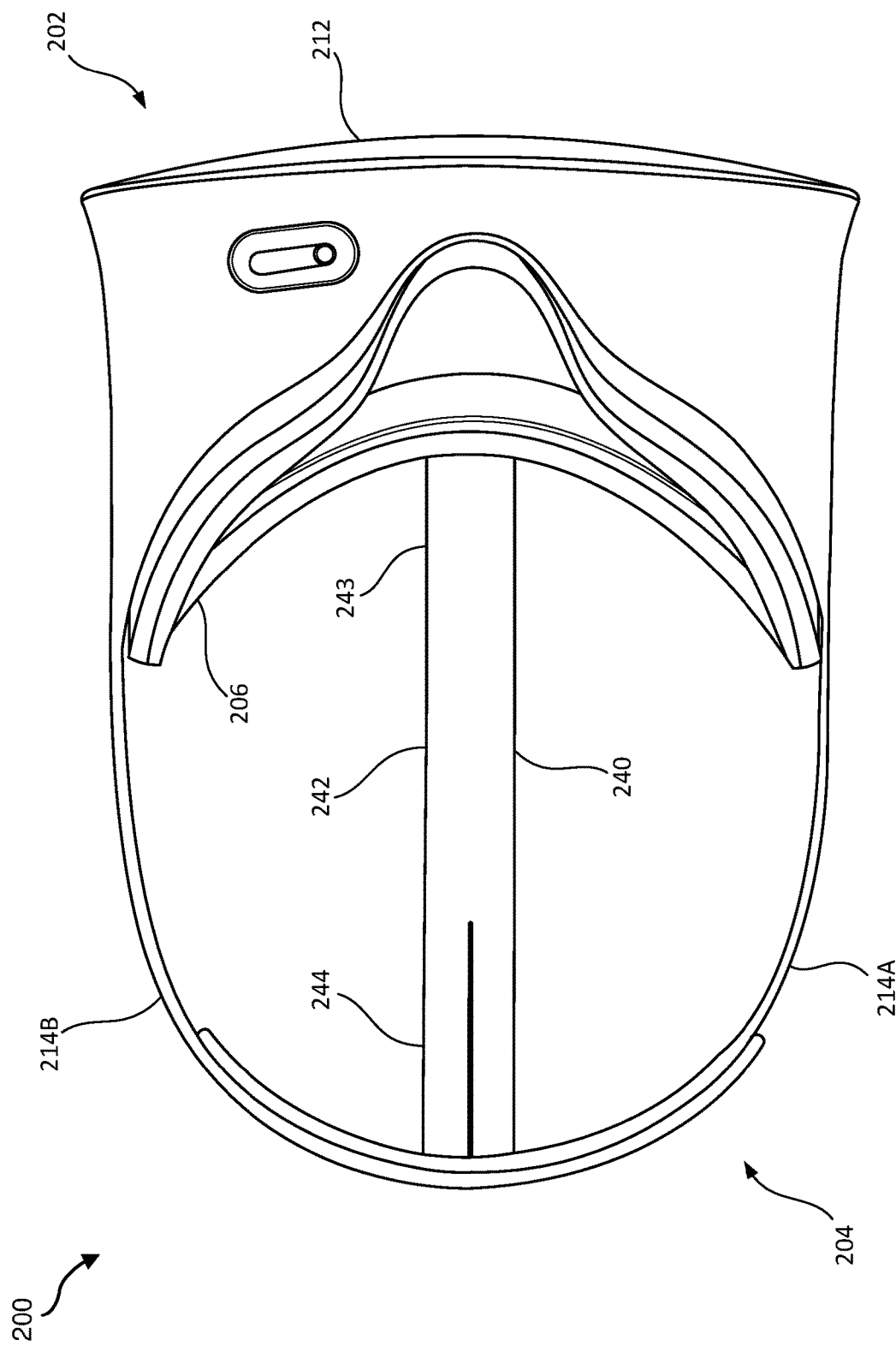
FIG. 5G is a bottom view of the exemplary head-mounted-display system of FIG. 5A in accordance with some embodiments.

Additionally, as illustrated in FIGS. 5A-5G, strap assembly 204 may include a top strap 240 adjustably coupled to head-mounted-display device 202 and each of first lateral strap member 214A and a second lateral strap member 214B to adjustably conform to the top (e.g., top 136) and back (e.g., back 132) of the user's head when the user is wearing head-mounted-display device 202 (see, e.g., FIG. 4B). Top strap 240 may be adjustable to fit various user head sizes and shapes. As shown in FIGS. 5A-5D, 5F, and 5G, top strap 240 may include a main body 242 and a proximal portion 243 adjustably coupled to head-mounted-display device 202. For example, proximal portion 243 may include a portion that that is mechanically adjustable by a user. In at least one example, a part of proximal portion 243 may pass through an attachment portion of head-mounted-display device 202, such as an attachment ring 241 as shown in FIG. 5F or a hole, and may be mechanically secured (e.g., by hook-and-loop fastening, hook-and-pile fastening, touch fastening, etc.) by the user in any suitable manner. Additionally, top strap 240 may include a split region 244 extending from main body 242 and coupled to each of first lateral strap member 214A and second lateral strap member 214B. Top strap 240 may provide additional support for securing head-mounted-display system 200 to the user's head (e.g., top strap 240 may be utilized with head-mounted-display device 202, which may be relatively larger in size and/or weight than head-mounted-display device 102 illustrated in FIGS. 1-4B).

Figure 6A:
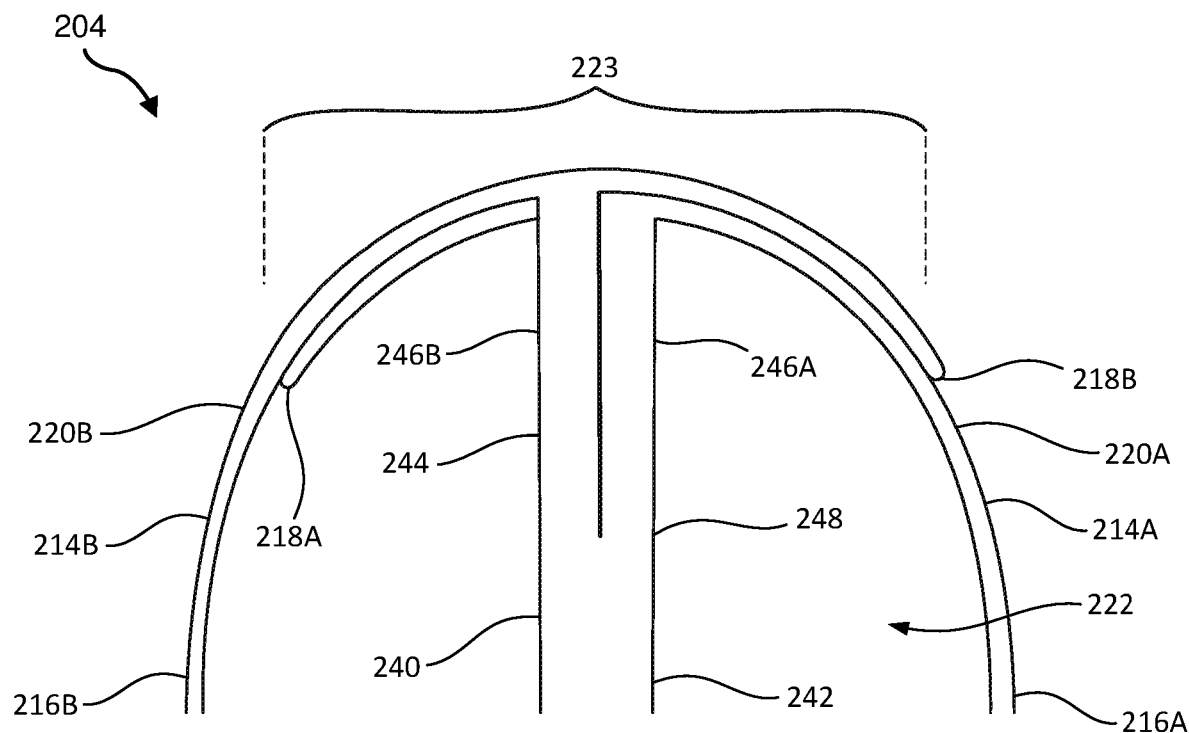
FIG. 6A is a top view of a strap assembly of the exemplary head-mounted-display system of FIG. 5A in accordance with some embodiments.
Figure 6B:
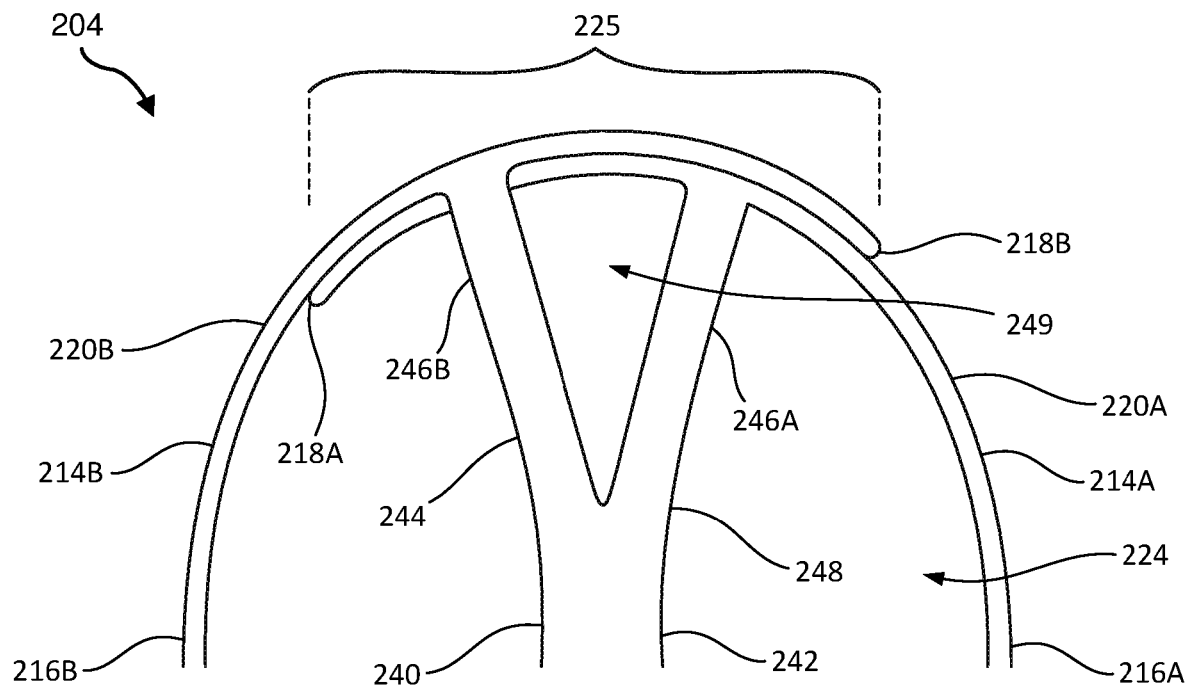
FIG. 6B is a top view of the strap assembly of the exemplary head-mounted-display system of FIG. 5A in accordance with some embodiments.

FIGS. 6A and 6B are top views of strap assembly 204 of head-mounted-display system 200 (see, e.g., FIGS. 5A-5G) with first lateral strap member 214A and second lateral strap member 214B in a relaxed state and in a tensioned state, respectively. As illustrated in these figures, first lateral strap member 214A and second lateral strap member 214B may respectively include a proximal portion 216A and a proximal portion 216B that are each coupled to head-mounted-display device 202. First lateral strap member 214A may be configured to extend along a left side of a user's head and may be coupled to a left side of head-mounted-display device 102. Additionally, second lateral strap member 214B may be configured to extend along a right side of a user's head and may be coupled to a right side of head-mounted-display device 202. In some embodiments, first lateral strap member 214A and second lateral strap member 214B may be integrally formed with head-mounted-display device 202 at proximal portion 216A and proximal portion 216B. Additionally or alternatively, first lateral strap member 214A and/or second lateral strap member 214B may be a separate member that is coupled to head-mounted-display device 202 in any suitable manner.

According to at least one embodiment, first lateral strap member 214A and second lateral strap member 214B may each extend from head-mounted-display device 202 to a distal end 218A and a distal end 218B, respectively. Distal end 218A and distal end 218B may be movable relative to each other and relative to head-mounted-display device 202 and main body 242 of top strap 240. For example, portions of first lateral strap member 214A and second lateral strap member 214B that respectively include distal end 218A and distal end 218B may slidably overlap and/or abut one another, allowing for deflection and tensioning of first lateral strap member 214A and second lateral strap member 214B while maintaining contact between overlapping portions of first lateral strap member 214A and second lateral strap member 214B. According to some embodiments, first lateral strap member 214A and second lateral strap member 214B may each respectively include an arcuate biasing section 220A and an arcuate biasing section 220B. For example, arcuate biasing section 220A of first lateral strap member 214A may arc from proximal portion 216A to distal end 218A. Additionally, arcuate biasing section 220B of second lateral strap member 214B may arc from proximal portion 216B to distal end 218B. First lateral strap member 214A and second lateral strap member 214B may each include a resilient material, as described above, such that arcuate biasing section 220A and arcuate biasing section 220B may be deflected and tensioned as discussed above in relation to arcuate biasing section 120A and arcuate biasing section 120B (see FIGS. 3A-4B).

Top-strap 240 may have a split configuration (e.g., a swallow-tail-shaped configuration) for attaching to both of first lateral strap member 214A and second lateral strap member 214B at the back of the user's head. For example, as shown in FIGS. 6A and 6B, split region 244 of top strap 240 may include a first distal end section 246A coupled to arcuate biasing section 220A of first lateral strap member 214A and a second distal end section 246B coupled to arcuate biasing section 220B of second lateral strap member 214B. First distal end section 246A and second distal end section 246B may be coupled to main body 242 at a junction region 248 of top strap 240. In some embodiments, first distal end section 246A and second distal end section 246B may each be movable relative to main body 242 in conjunction with arcuate biasing section 220A and arcuate biasing section 220B, respectively. For example, an angular disposition of first distal end section 246A with respect to main body 242 may change in conjunction with a change in position of arcuate biasing section 220A. Additionally, an angular disposition of second distal end section 246B with respect to main body 242 may change in conjunction with a change in position of arcuate biasing section 220B.

As shown in FIG. 6A, when head-mounted-display system 200 is not mounted to a user's head, arcuate biasing section 220A and arcuate biasing section 220B may peripherally surround at least a portion of a reduced region 222 and arcuate biasing section 220A and arcuate biasing section 220B may be in a relaxed (i.e., substantially untensioned) state. Reduced region 222 may, for example, be peripherally surrounded by first lateral strap member 214A, second lateral strap member 214B, and head-mounted-display device 202. When arcuate biasing section 220A and arcuate biasing section 220B are in the relaxed state, arcuate biasing section 220A may have an area of overlap 223 with arcuate biasing section 220B. According to some embodiments, when arcuate biasing section 220A and arcuate biasing section 220B are in a relaxed state, as shown in FIG. 6A, first distal end section 246A and second distal end section 246B may be positioned, along their respective lengths, in closest proximity to one another.

Subsequently, as shown in FIG. 6B, when head-mounted-display system 200 is mounted to a user's head, arcuate biasing section 220A and arcuate biasing section 220B may be tensioned and deflected outward by the user's head and may peripherally surround at least a portion of an increased region 224 corresponding to the size of a portion of a user's head surrounded by head-mounted-display system 200 (see, e.g., FIG. 4B). When arcuate biasing section 220A and arcuate biasing section 220B are in the tensioned state, arcuate biasing section 220A may have an area of overlap 225 with arcuate biasing section 220B that is less than the area of overlap 223 between arcuate biasing section 220A and arcuate biasing section 220B in the relaxed state. In some embodiments, when 2201 and arcuate biasing section 220B are tensioned in an outwardly deflected state, as shown in FIG. 6B, first distal end section 246A and second distal end section 246B may be angled away from each other. For example, first distal end section 246A and second distal end section 246B may be angled away from each other such that a gap 249 is defined between first distal end section 246A and second distal end section 246B, as illustrated in FIG. 6B.

Although the respective orientations of first distal end section 246A and second distal end section 246B may change in accordance with changes in position of arcuate biasing section 220A and arcuate biasing section 220B, respectively, main body 242 of top strap 240 may remain substantially centered relative to arcuate biasing section 220A and arcuate biasing section 220B. Accordingly, top strap 240 may be substantially centered on a user's head regardless of the size and/or shape of the user's head, enabling head-mounted-display system 200 to be comfortably and securely worn by various users.

Figure 7A:
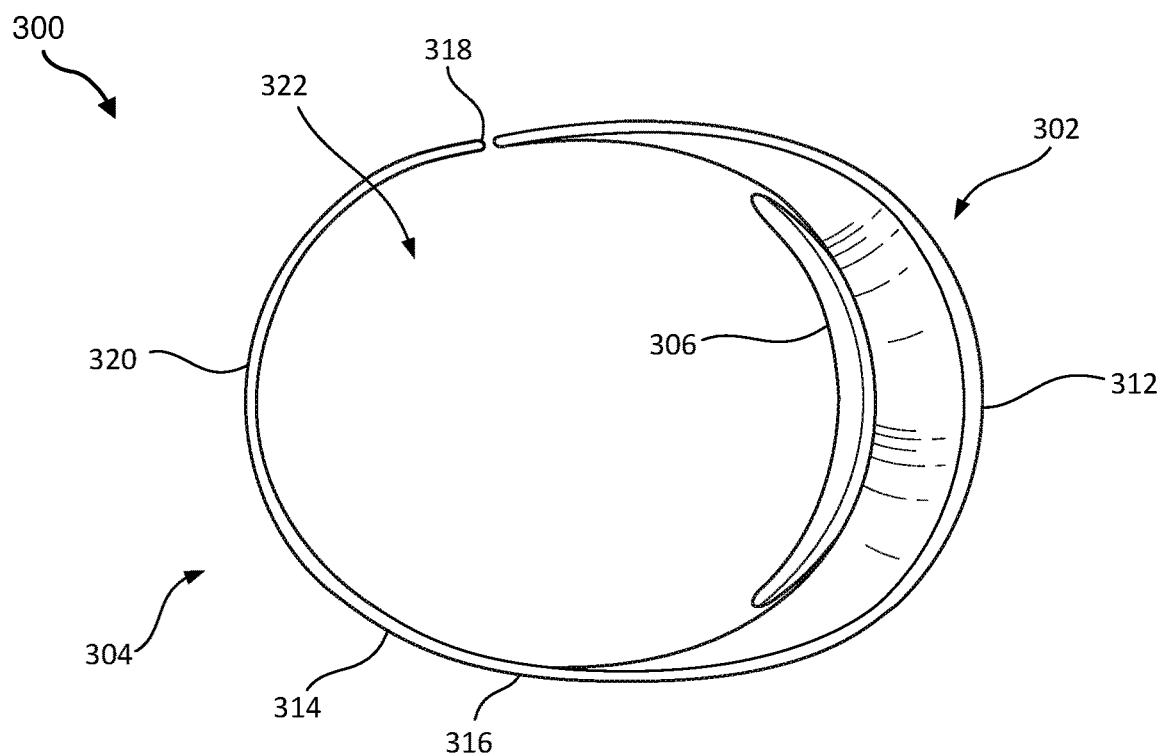
FIG. 7A is a top view of an exemplary head-mounted-display system in accordance with some embodiments.
Figure 7B:
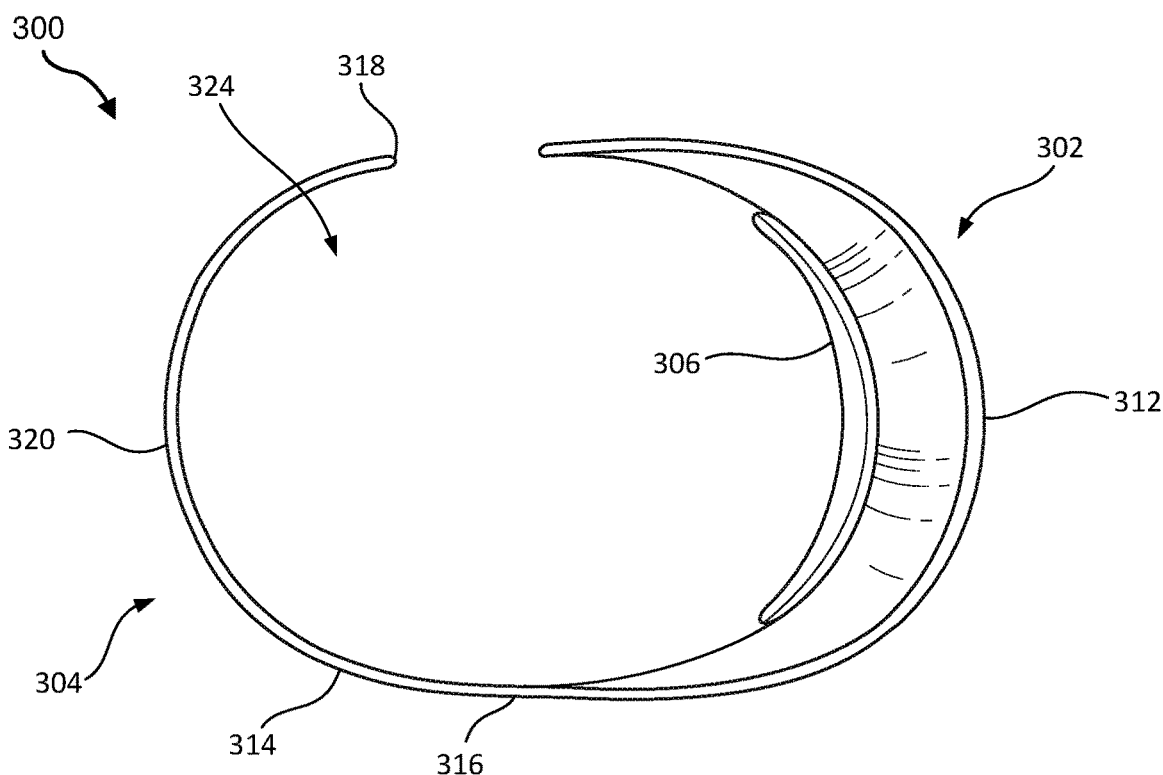
FIG. 7B is a top view of the exemplary head-mounted-display system of FIG. 7A in accordance with some embodiments.

FIGS. 7A and 7B are top views of a head-mounted-display system 300 having a single lateral strap member 314 in accordance with some embodiments. In at least one embodiment, head-mounted-display system 300 may include a head-mounted-display device 302, a strap assembly 304, and a facial interface 306. Head-mounted-display device 302 may include a display housing 312 surrounding various components of head-mounted-display device 302 as described above. Strap assembly 304 may include a single lateral strap member 314 that is automatically adjustable to fit around a user's head. For example, as shown in FIGS. 7A and 7B, lateral strap member 314 may be coupled to head-mounted-display device 302 to adjustably conform to the sides (i.e., left and right sides) and back of the user's head when the user is wearing head-mounted-display device 302.

As illustrated in these figures, lateral strap member 314 may include a proximal portion 316 that is coupled to head-mounted-display device 302 (e.g., lateral strap member 314 may be coupled to a left or right side of head-mounted-display device 302, such as the right side of head-mounted-display device 302 as shown). In some embodiments, lateral strap member 314 may be integrally formed with head-mounted-display device 302 at proximal portion 316. Additionally or alternatively, lateral strap member 314 may be a separate member that is coupled to head-mounted-display device 302 in any suitable manner. According to at least one embodiment, lateral strap member 314 may extend from head-mounted-display device 302 to a distal end 318. Distal end 318 may be movable relative to head-mounted-display device 302, allowing for deflection and tensioning of lateral strap member 314. According to some embodiments, lateral strap member 314 may include an arcuate biasing section 320 that arcs from proximal portion 316 to distal end 318. Lateral strap member 314 may include a resilient material, as described above, such that arcuate biasing section 320 may be deflected and tensioned. Arcuate biasing section 320 may follow any suitable arcuate path, with arcuate biasing section 320 generally arcing around a substantial portion of a user's head when head-mounted-display system 300 is worn by the user.

As shown in FIG. 7A, when head-mounted-display system 300 is not mounted to a user's head, arcuate biasing section 320 may peripherally surround at least a portion of a reduced region 322 and arcuate biasing section 320 may be in a relaxed state. Reduced region 322 may, for example, be peripherally surrounded by lateral strap member 314 and head-mounted-display device 302.

Subsequently, as shown in FIG. 7B, when head-mounted-display system 300 is, for example, mounted to a user's head, arcuate biasing section 320 may peripherally surround at least a portion of an increased region 324. The size of increased region 324 may correspond to the size of a portion of a user's head surrounded by head-mounted-display system 300 (see, e.g., FIG. 4B) and may be larger than the size of reduced region 322 shown in FIG. 7A. When head-mounted-display system 300 is mounted to the user's head, head-mounted-display device 302 may abut a face of the user and lateral strap member 314, including arcuate biasing section 320, may extend along and abut a first side (e.g., the right side), the back, and a second side (e.g., the left side) of the user's head. Arcuate biasing section 320 may be tensioned and deflected outward by the user's head from the configuration shown in FIG. 7A to the configuration shown in FIG. 7B.

When arcuate biasing section 320 is tensioned and deflected outward, as shown in FIG. 7B, to accommodate left, right, and/or back portions of the user's head, at least a portion of arcuate biasing section 320 may be biased toward the user's head by, for example, a restoring force of a resilient material of arcuate biasing section 320. In some examples, arcuate biasing section 320 may apply a substantially constant large-scale force to back and/or sides of the user's head due to outward deflection and tensioning of arcuate biasing section 320 at multiple points along the lengths of arcuate biasing section 320. Additionally, head-mounted-display device 302 may be biased by arcuate biasing section 320 of lateral strap member 314 toward the face of the user to securely position and mount head-mounted-display device 302 on the user's face.

Figure 8:
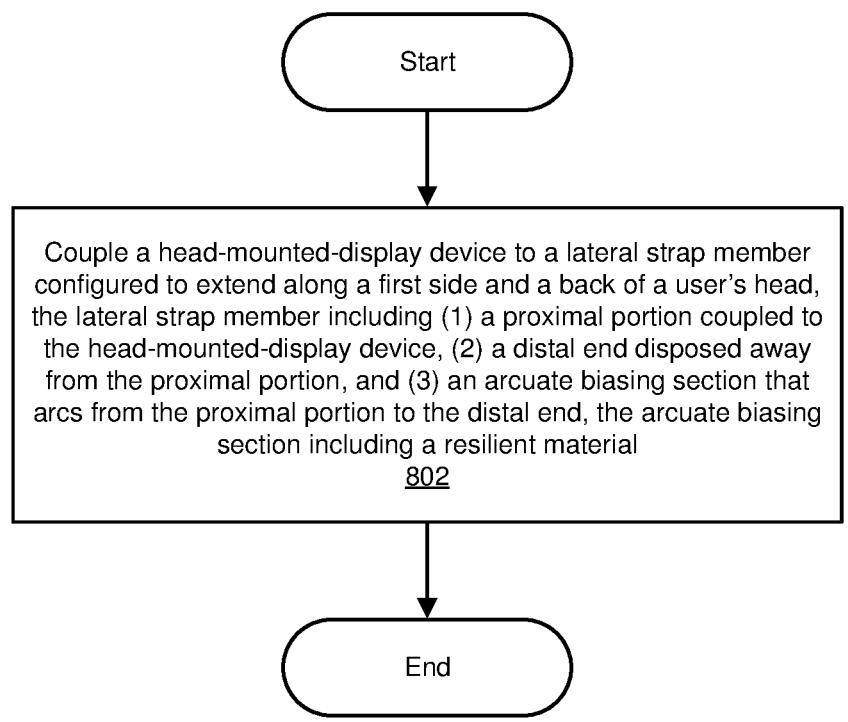
FIG. 8 is a block diagram of an exemplary method for assembling a head-mounted-display system in accordance with some embodiments.

FIG. 8 is a flow diagram of an exemplary method 800 for assembling a head-mounted-display system according to any of the embodiments disclosed herein. The steps shown in FIG. 8 may be performed by an individual and/or by any suitable manual and/or automated apparatus.

At step 802 in FIG. 8, a head-mounted-display device may be coupled to a lateral strap member configured to extend along a first side and a back of a user's head. For example, head-mounted-display device 102 may be coupled to first lateral strap member 114A configured to extend along first side 134 and back 132 of head 128 of user 126 (see, e.g., FIGS. 1-4B; see also, FIGS. 5A-7B).

The lateral strap member may include (1) a proximal portion coupled to the head-mounted-display device, (2) a distal end disposed away from the proximal portion, and (3) an arcuate biasing section that arcs from the proximal portion to the distal end, the arcuate biasing section including a resilient material. For example, first lateral strap member 114A may include (1) proximal portion 116A coupled to head-mounted-display device 102, (2) distal end 118A disposed away from proximal portion 116A, and (3) arcuate biasing section 120A that arcs from proximal portion 116A to distal end 118A (see, e.g., FIGS. 3A-4B; see also, FIGS. 6A-7B). Arcuate biasing section 120A may include a resilient material (e.g., a resilient band of a metal, polymer, and/or a composite material).

The arcuate biasing section may peripherally surround at least a portion of a reduced region when the arcuate biasing section is in a relaxed state. For example, arcuate biasing section 120A may peripherally surround at least a portion of reduced region 122 when arcuate biasing section 120A is in a relaxed state (see, e.g., FIGS. 3A and 4A; see also FIGS. 6A and 7A). Additionally, the arcuate biasing section may be tensioned and deflected outward by the user's head when the head-mounted-display device and the lateral strap member are worn by the user such that the arcuate biasing section peripherally surrounds at least a portion of an increased region that is greater in size than the reduced region and such that at least a portion of the arcuate biasing section is biased toward the user's head. For example, arcuate biasing section 120A may be tensioned and deflected outward by head 128 of user 126 when head-mounted-display device 102 and first lateral strap member 114A are worn by user 126 such that arcuate biasing section 120A peripherally surrounds at least a portion of increased region 124 that is greater in size than reduced region 122 and such that at least a portion of arcuate biasing section 120A is biased toward the head 128 of user 126. (see, e.g., FIGS. 3B and 4B; see also FIGS. 6B and 7B).

According to at least one embodiment, the lateral strap member may be a first lateral strap member and the method may further include coupling the head-mounted-display device to a second lateral strap member configured to extend along a second side of the user's head. For example, head-mounted-display device 102 may be coupled to second lateral strap member 114B configured to extend along a second side (opposite first side 134) of head 128 of user 126 (see, e.g., FIGS. 1-4B; see also, FIGS. 5A-7B).

The second lateral strap member may include (1) a proximal portion coupled to the head-mounted-display device, (2) a distal end disposed away from the proximal portion of the second lateral strap member, and (3) an arcuate biasing section that arcs from the proximal portion to the distal end of the second lateral strap member, the arcuate biasing section of the second lateral strap member including a resilient material. For example, second lateral strap member 114B may include (1) proximal portion 116B coupled to head-mounted-display device 102, (2) distal end 118B disposed away from proximal portion 116B, and (3) arcuate biasing section 120B that arcs from proximal portion 116B to distal end 118B, arcuate biasing section 120B including a resilient material. (see, e.g., FIGS. 3A-4B; see also, FIGS. 6A-7B).

As discussed throughout the instant disclosure, the disclosed systems, devices, and methods may provide one or more advantages over traditional facial-interface systems and head-mounted displays. For example, the head-mounted-display systems may have strap assemblies that enable users to quickly, easily, and comfortably mount head-mounted-display devices to their heads. The strap assemblies may include lateral strap members having arcuate biasing sections formed of a resilient material (e.g., an arcuate band formed of resilient metal, polymer, and/or composite material). The arcuate biasing sections of the one or more lateral strap members may enable the strap assembly to automatically adjust to the user's head shape and size with little or no manual adjustment of the strap assembly required by the user. Forces applied by the tensioned arcuate biasing sections against the user's head may securely hold the head-mounted-display device on the user's head. Additionally, such a strap assembly may apply a substantially constant large-scale force to a variety of user head sizes and shapes, enabling the head-mounted-display systems to be easily and comfortably worn by various users. In some examples, strap assemblies may also include an adjustable top strap that enables headsets to be more securely mounted to a user's head while allowing for automatic adjustment of the lateral strap members.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A strap assembly comprising:
  a first lateral strap member configured to extend along a first side and a back of a user's head;
  a second lateral strap member configured to extend along a second side and the back of the user's head, the first and second lateral strap members each comprising:
    a proximal portion configured to be coupled to a head-mounted-display device;
    a distal end disposed away from the proximal portion; and
    a first and second arcuate biasing sections that arcs from the proximal portion to the distal end of the first and second lateral strap members, the first and second arcuate biasing sections comprising a resilient material, wherein:
  the first and second arcuate biasing sections peripherally surround at least a portion of a reduced region when the first and second arcuate biasing sections are in a relaxed state;
  the first and second arcuate biasing sections are automatically tensioned by the resilient material and deflected outward by the user's head when the first and second lateral strap members are worn with the head-mounted-display device by the user such that the first and second arcuate biasing sections peripherally surround at least a portion of an increased region that is greater in size than the reduced region and such that at least a portion of the first and second arcuate biasing sections are biased toward the user's head; and
  the first and second arcuate biasing sections maintain contact between overlapping portions of the first and second arcuate biasing sections.

2. The strap assembly of claim 1, wherein the first and second arcuate biasing sections comprise an arcuate band of the resilient material.

3. The strap assembly of claim 1, wherein the resilient material comprises at least one of a metal material, polymer material, or a composite material.

4. The strap assembly of claim 1, wherein the distal end of the first and second lateral strap members are movable with respect to the proximal portion of the first and second lateral strap members respectively.

5. The strap assembly of claim 1, wherein at least the portion of the first arcuate biasing section is biased toward at least one of the first side or the back of the user's head when the first lateral strap member is worn with the head-mounted-display device by the user.

6. The strap assembly of claim 1, wherein the first arcuate biasing section is unstretched when the lateral strap member is worn with the head-mounted-display device by the user.

7. The strap assembly of claim 1, wherein, when the first lateral strap member is worn with the head-mounted-display device by the user, a radius of curvature of at least a region of the first arcuate biasing section is greater than a radius of curvature of at least the region of the first arcuate biasing section when the first arcuate biasing section is in the relaxed state.

8. The strap assembly of claim 1, wherein the first and second arcuate biasing sections are configured to extend along a back portion of the user's head.

9. The strap assembly of claim 1, wherein the distal end of the first arcuate biasing section of the first lateral strap member is movable with respect to the distal end of the second arcuate biasing section of the second lateral strap member such that an area of the overlapping portions between the first arcuate biasing section of the first lateral strap member and the second arcuate biasing section of the second lateral strap member is greater when the first arcuate biasing section of the first lateral strap member and the second arcuate biasing section of the second lateral strap member are each in a relaxed state than when the first lateral strap member and the second lateral strap member are worn with the head-mounted-display device by the user.

10. The strap assembly of claim 1, further comprising a top strap coupled with each of the first lateral strap member and the second lateral strap member, the top strap comprising a proximal portion configured to be adjustably coupled to the head-mounted-display device.

11. The strap assembly of claim 10, wherein the top strap comprises a split region comprising a first distal end section coupled to the first arcuate biasing section of the first lateral strap member and a second distal end section coupled to the second arcuate biasing section of the second lateral strap member.

12. The strap assembly of claim 11, wherein a main body section of the top strap is coupled to each of the first distal end section and the second distal end section at a junction region of the top strap.

13. The strap assembly of claim 12, wherein:
  the first distal end section is movable, relative to the main body section, in conjunction with the first arcuate biasing section of the first lateral strap member; and
  the second distal end section is movable, relative to the main body section, in conjunction with the second arcuate biasing section of the second lateral strap member.

14. A head-mounted-display system comprising:
  a head-mounted-display device; and
  a first lateral strap member configured to extend along a first side and a back of a user's head;
  a second lateral strap member configured to extend along a second side and the back of the user's head, the first and second lateral strap members each comprising:
    a proximal portion coupled to the head-mounted-display device;
    a distal end disposed away from the proximal portion; and
    a first and second arcuate biasing sections that arcs from the proximal portion to the distal end of the first and second lateral strap members, the first and second arcuate biasing sections comprising a resilient material, wherein:
      the first and second arcuate biasing sections peripherally surround at least a portion of a reduced region when the first and second arcuate biasing sections are in a relaxed state;
      the first and second arcuate biasing sections are automatically tensioned by the resilient material and deflected outward by the user's head when the head-mounted-display system is worn by the user such that the first and second arcuate biasing sections peripherally surround at least a portion of an increased region that is greater in size than the reduced region and such that at least a portion of the first and second arcuate biasing sections are biased toward the user's head; and
      the first and second arcuate biasing sections maintain contact between overlapping portions of the first and second arcuate biasing sections.

15. A method comprising:
  coupling a head-mounted-display device to a first lateral strap member configured to extend along a first side and a back of a user's head;
  a second lateral strap member configured to extend along a second side and the back of the user's head, the first and second lateral strap members comprising:
    a proximal portion coupled to the head-mounted-display device;
    a distal end disposed away from the proximal portion; and
    a first and second arcuate biasing sections that arcs from the proximal portion to the distal end of the first and second lateral strap members, the first and second arcuate biasing sections comprising a resilient material, wherein:

the first and second arcuate biasing sections peripherally surround at least a portion of a reduced region when the first and second arcuate biasing sections are in a relaxed state;

the first and second arcuate biasing sections are automatically tensioned by the resilient material and deflected outward by the user's head when the head-mounted-display device and the first and second lateral strap members are worn by the user such that the first and second arcuate biasing sections peripherally surround at least a portion of an increased region that is greater in size than the reduced region and such that at least a portion of the first and second arcuate biasing sections are biased toward the user's head; and the first and second arcuate biasing sections maintain contact between overlapping portions of the first and second arcuate biasing sections.

* * * * *